(12) United States Patent
Jackson et al.

(10) Patent No.: US 12,534,106 B2
(45) Date of Patent: Jan. 27, 2026

(54) SYSTEMS AND METHODS FOR LOCALIZING AN AUTONOMOUS VEHICLE

(71) Applicant: Aurora Operations, Inc., Mountain View, CA (US)

(72) Inventors: James Jackson, Fruit Heights, UT (US); Daniel Koch, Wexford, PA (US); Michael Samples, Redmond, WA (US); David Wheeler, Pittsburgh, PA (US); Robert Zlot, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 199 days.

(21) Appl. No.: 18/468,072

(22) Filed: Sep. 15, 2023

(65) Prior Publication Data

US 2025/0091604 A1   Mar. 20, 2025

(51) Int. Cl.
*B60W 60/00* (2020.01)

(52) U.S. Cl.
CPC ..... *B60W 60/001* (2020.02); *B60W 2420/408* (2024.01); *B60W 2556/40* (2020.02)

(58) Field of Classification Search
CPC ........... B60W 60/001; B60W 2556/40; B60W 2420/408
See application file for complete search history.

(56) References Cited

U.S. PATENT DOCUMENTS

| 2019/0066329 | A1* | 2/2019 | Luo | G06T 7/579 |
| 2019/0266179 | A1* | 8/2019 | Wheeler | G05D 1/0088 |
| 2020/0160558 | A1* | 5/2020 | Urtasun | G06F 18/21355 |
| 2022/0075382 | A1 | 3/2022 | Montemerlo et al. | |

(Continued)

FOREIGN PATENT DOCUMENTS

| CN | 111273305 A | 6/2020 |
| CN | 116047565 A | 5/2023 |

(Continued)

OTHER PUBLICATIONS

Cui et al., "Real-time global localization of intelligent road vehicles in lane-level via lane marking detection and shape registration," 2014 IEEE/RSJ International Conference on Intelligent Robots and Systems, 2014, Chicago, Illinois, 12 pages.

(Continued)

*Primary Examiner* — Peter D Nolan
*Assistant Examiner* — Mikko Okechukwu Obioha
(74) *Attorney, Agent, or Firm* — Dority & Manning, P.A.

(57) ABSTRACT

A computing system can obtain, through one or more sensor systems onboard an autonomous vehicle, a motion input, a surface element registration input representing one or more tracked surface elements, and a lane alignment input representing one or more lane boundaries. The computing system can provide the motion input, the surface element registration input, and the lane alignment input to a pose estimation system including a localization filter. The pose estimation system can generate one or more pose states of the autonomous vehicle, including a local pose and a global pose. The computing system can determine a motion plan for the autonomous vehicle based on the one or more pose states.

20 Claims, 12 Drawing Sheets

(56) References Cited

U.S. PATENT DOCUMENTS

2024/0270282 A1* 8/2024 Jones ................ B60W 60/0018
2024/0328792 A1* 10/2024 Chang ................ G01C 21/3848

FOREIGN PATENT DOCUMENTS

KR          20220063716 A      5/2022
WO     WO 2022/051263 A1      3/2022

OTHER PUBLICATIONS

ROS.org, "Coordinate frames for mobile platforms", Oct. 27, 2010, https://www.ros.org/reps/rep-0105.html, retrieved on Oct. 13, 2023, 7 pages.
International Search Report and Written Opinion for Application No. PCT/US2023/085688, mailed Jun. 10, 2024, 10 pages.

\* cited by examiner

SYSTEMS AND METHODS FOR LOCALIZING AN AUTONOMOUS VEHICLE

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

An autonomous vehicle, such as an autonomous vehicle towing a trailer (e.g., an autonomous truck) can navigate through the use of a pose estimation system. Autonomous vehicles can desirably localize themselves with respect to their environment. Autonomous vehicle control system(s) (e.g., located at least partially onboard an autonomous vehicle) can receive inputs that facilitate localization of the autonomous vehicle relative to a local or global reference. For instance, the autonomous vehicle control system can capture sensor data from sensors observing the environment of the autonomous vehicle. The autonomous vehicle control system can also receive map data indicative of known terrain, structures, etc., motion data from an inertial measurement unit (IMU) onboard the vehicle, wheel rotation data from wheel encoders, or other suitable inputs. These inputs can be highly reliable. However, it can be desirable to safeguard against occasional sensor input error, especially over a high-mileage operating lifetime of an autonomous vehicle.

The present disclosure is directed to systems and methods for localizing an autonomous vehicle. In one example aspect of the present disclosure, pose updates from LIDAR alignment modules and lane alignment modules are fused with local pose estimates (e.g., from an IMU) in the same filter. The localization filter can use measurements from sensors, such as IMUs, encoders, RADAR velocity, LIDAR systems and processing modules, etc. and fuse available information under a principled framework, such as a Kalman filter, to estimate a pose state of an autonomous platform (e.g., an autonomous vehicle). The pose state can include both global pose (e.g., defined relative to a structured, persistent map) or a local pose (e.g., defined relative to an initial position of the autonomous vehicle in an observable environment of the autonomous platform).

Fusing these measurement sources, some of which can be redundant, in a single filter provides for a principled anomaly detection and rejection approach as well as improved observability of biases, miscalibrations, or other sources of inaccurate data. This approach can also provide for simplified onboard autonomous vehicle control system architecture, as it can operate with fewer modules than some existing systems and reduce interactions between modules, which can be difficult to reason about. This, in turn, can reduce computational requirements associated with operating the autonomous vehicle control system. In addition, it can also reduce development costs associated with cross-module interaction compatibility and testing. Furthermore, systems and methods according to example aspects of the present disclosure can correct for drift rates in local measurement by combining different sensor modalities to better reason about the environment of the autonomous vehicle.

Systems and methods according to example aspects of the present disclosure can include a localization filter, such as a Kalman filter, or interfaces between the filter and other systems, such as, for example, out-of-order measurement processing for latent measurements such as LIDAR alignment, a finite state machine for managing modes of operation, or other systems.

According to example aspects of the present disclosure, the autonomous vehicle control system can include a pose estimation system that is configured to implement localization techniques that protect against such errors. To do so, the pose estimation system can employ a Kalman filter to generate pose states for the autonomous vehicle. For example, the pose estimation system can determine acceleration or orientation of the autonomous vehicle relative to local references, such as lane lines, signage, etc., or relative to global references, such as a tiled map. In addition, the pose estimation system can, using the Kalman filter, generate localization outputs for static objects in the environment of the autonomous vehicle. The pose estimation model can be a finite state machine. Additionally, the pose estimation system can maintain a complete state encapsulation over a prior time interval. This can provide for out-of-order measurements, such as measurements arriving at an increased latency relative to other measurements, to be incorporated into the existing states.

The pose estimation system can generate smooth pose outputs that are less sensitive to noise or errors at the inputs. For instance, the pose estimation system, through the use of a Kalman filter, can probabilistically determine a reliable pose estimate even if inputs provide temporarily inaccurate readings. The pose estimation module can maintain a distribution, such as a mean or covariance, of various attributes corresponding to pose characteristics. This distribution can help account for or mitigate biases in systems such as the IMU, drift in measurements over time, temporary inconsistencies or outages, or other sources of error in the autonomous vehicle control system.

Systems and methods according to example aspects of the present disclosure can provide for a number of technical effects and benefits. As one example, systems and methods according to example aspects of the present disclosure can provide for improved observability of error sources such as IMU biases or estimation of other sources of error, such as sensor miscalibration. Fusing redundant measurement sources in a Kalman filter also provides for a principled condition-detection (e.g., error detection) and rejection approach. In addition, a simplified design architecture can reduce computational resource requirements or reduce complex interactions between systems/modules, which must be reasoned about, as well as reducing testing resources required by developers.

For example, in an aspect, the present disclosure provides for an autonomous vehicle control system. In some implementations, the autonomous vehicle control system includes one or more processors and one or more non-transitory, computer-readable media storing instructions that cause the one or more processors to perform operations. In some implementations, the operations include obtaining, through one or more sensor systems onboard an autonomous vehicle, a motion input indicative of movement of the autonomous vehicle within the environment of the autonomous vehicle, a surface element (surfel) registration input representing an alignment of one or more tracked surface elements in the environment of the autonomous vehicle, and a lane alignment input representing an alignment of one or more lane boundaries in the environment of the autonomous vehicle. In some implementations, the operations include providing the motion input, the surfel registration input, and the lane alignment input to a pose estimation system including a localization filter. In some implementations, the operations include generating, by the localization filter, one or more pose states of the autonomous vehicle, the one or more pose states including at least a local pose and a global pose. In some implementations, the operations include determining a motion plan for the autonomous vehicle based on the one or more pose states.

In some implementations of the example autonomous vehicle control system, the local pose is defined relative to an initial position of the autonomous vehicle in the environment and the global pose is defined relative to a tiled global map of the environment. For instance, the local pose can be defined relative to a coordinate frame or frame of reference established with respect to the initial position of the vehicle and updated as the vehicle moves relative to its initial position. The local pose can be consistent over short timeframes, such as timeframes on the order of several seconds. The local pose may be periodically refreshed. For instance, periodically refreshing the local pose may help mitigate the effects of pose drift over time.

In some implementations of the example autonomous vehicle control system, the operations include estimating an initial pose state of the autonomous vehicle based on wheel encoder data from one or more wheel encoders positioned onboard the autonomous vehicle, wherein generating the one or more pose states is based on the initial pose state.

In some implementations of the example autonomous vehicle control system, generating the one or more pose states includes aligning the one or more pose states to the one or more lane boundaries or the one or more tracked surface elements such that the one or more lane boundaries or the one or more tracked surface elements are consistent in a reference frame.

In some implementations of the example autonomous vehicle control system, generating the one or more pose states includes selecting a map tile, wherein selecting a map tile includes obtaining a first map tile based on the global pose; predicting a future position of the autonomous vehicle at a future timestamp based on the motion input, the surfel registration input, and the lane alignment input; and selecting the map tile based on the future position of the autonomous vehicle, wherein selecting the map tile includes publishing the map tile and the future timestamp.

In some implementations of the example autonomous vehicle control system, the one or more sensor systems include an inertial measurement unit (IMU), and the motion input includes data from the IMU.

In some implementations of the example autonomous vehicle control system, the one or more pose states include a distribution of pose characteristics over time.

In some implementations of the example autonomous vehicle control system, generating the one or more pose states includes receiving an input corresponding to a prior timestamp; updating a prior pose state at the prior timestamp based on the input to produce an updated prior pose state; or propagating the updated prior pose state to a current timestamp to generate the one or more pose states.

In some implementations of the example autonomous vehicle control system the surfel registration input and the lane alignment input are based on at least one of a RADAR input or a LIDAR input. In some implementations of the example autonomous vehicle control system, the RADAR input is associated with a sensor velocity module configured to estimate velocity from the RADAR input.

In some implementations of the example autonomous vehicle control system, the localization filter includes a Kalman filter.

For example, in an aspect, the present disclosure provides an example computer-implemented method. In some implementations, the computer-implemented method includes obtaining, through one or more sensor systems onboard an autonomous vehicle, a motion input indicative of movement of the autonomous vehicle within the environment of the autonomous vehicle, a surface element (surfel) registration input representing an alignment of one or more tracked surface elements in the environment of the autonomous vehicle, and a lane alignment input representing an alignment of one or more lane boundaries in the environment of the autonomous vehicle. In some implementations, the computer-implemented method includes providing the motion input, the surfel registration input, and the lane alignment input to a pose estimation system including a localization filter. In some implementations, the computer-implemented method includes generating, by the localization filter, one or more pose states of the autonomous vehicle, the one or more pose states including a local pose and a global pose. In some implementations, the computer-implemented method includes determining a motion plan for the autonomous vehicle based on the one or more pose states.

In some implementations of the example method, the local pose is defined relative to an initial position of the autonomous vehicle in the environment and the global pose is defined relative to a tiled global map of the environment.

In some implementations of the example method, the method include estimating an initial pose state of the autonomous vehicle based on wheel encoder data from one or more wheel encoders positioned onboard the autonomous vehicle, wherein generating the one or more pose states is based on the initial pose state.

In some implementations of the example method, generating the one or more pose states includes aligning the one or more pose states to the one or more lane boundaries or the one or more tracked surface elements such that the one or more lane boundaries or the one or more tracked surface elements are consistent in a reference frame.

In some implementations of the example method, generating the one or more pose states includes selecting a map tile, wherein selecting a map tile includes obtaining a first map tile based on the global pose; predicting a future position of the autonomous vehicle at a future timestamp based on the surfel registration input, the lane alignment input, and the motion input; and selecting the map tile based on the future position of the autonomous vehicle, wherein selecting the map tile includes publishing the map tile and the future timestamp.

In some implementations of the example method, the one or more sensor systems include an inertial measurement unit (IMU), and the motion input includes data from the IMU.

In some implementations of the example method, the one or more pose states include a distribution of pose characteristics over time.

In some implementations of the example method, generating the one or more pose states includes receiving an input corresponding to a prior timestamp; updating a prior pose state at the prior timestamp based on the input to produce an updated prior pose state; or propagating the updated prior pose state to a current timestamp to generate the one or more pose states.

In some implementations of the example method, the surfel registration input and the lane alignment input are based on at least one of a RADAR input or a LIDAR input.

In some implementations of the example method, the RADAR input is associated with a sensor velocity module configured to estimate velocity from the RADAR input.

In some implementations of the example method, the localization filter includes a Kalman filter.

For example, in an aspect, the present disclosure provides for an autonomous vehicle. In some implementations, the autonomous vehicle includes one or more processors and one or more non-transitory, computer-readable media storing instructions that cause the one or more processors to perform operations. In some implementations, the operations include obtaining, through one or more sensor systems onboard an autonomous vehicle, a motion input indicative of movement of the autonomous vehicle within the environment of the autonomous vehicle, a surface element (surfel) registration input representing an alignment of one or more tracked surface elements in the environment of the autonomous vehicle, and a lane alignment input representing an alignment of one or more lane boundaries in the environment of the autonomous vehicle. In some implementations, the operations include providing the surfel registration input, the lane alignment input, and the motion input to a pose estimation system including a localization filter. In some implementations, the operations include generating, by the localization filter, one or more pose states of the autonomous vehicle, the one or more pose states including at least a local pose and a global pose. In some implementations, the operations include determining a motion plan for the autonomous vehicle based on the one or more pose states.

In some implementations of the example autonomous vehicle, the local pose is defined relative to an initial position of the autonomous vehicle in the environment and the global pose is defined relative to a tiled global map of the environment.

In some implementations of the example autonomous vehicle, the operations include estimating an initial pose state of the autonomous vehicle based on wheel encoder data from one or more wheel encoders positioned onboard the autonomous vehicle, wherein generating the one or more pose states is based on the initial pose state.

In some implementations of the example autonomous vehicle, generating the one or more pose states includes aligning the one or more pose states to the one or more lane boundaries or the one or more tracked surface elements based on the surfel registration input, the lane alignment input, and the motion input.

In some implementations of the example autonomous vehicle, generating the one or more pose states includes selecting a map tile, wherein selecting a map tile includes obtaining a first map tile based on the global pose; predicting a future position of the autonomous vehicle at a future timestamp based on the surfel registration input, the lane alignment input, and the motion input; and selecting the map tile based on the future position of the autonomous vehicle, wherein selecting the map tile includes publishing the map tile and the future timestamp.

In some implementations of the example autonomous vehicle, the one or more sensor systems include an inertial measurement unit (IMU), and the motion input includes data from the IMU.

In some implementations of the example autonomous vehicle, the one or more pose states include a distribution of pose characteristics over time.

In some implementations of the example autonomous vehicle, generating the one or more pose states includes receiving an input corresponding to a prior timestamp; updating a prior pose state at the prior timestamp based on the input to produce an updated prior pose state; or propagating the updated prior pose state to a current timestamp to generate the one or more pose states.

In some implementations of the example autonomous vehicle, the surfel registration input and the lane alignment input are based on at least one of a RADAR input or a LIDAR input. In some implementations of the example autonomous vehicle, the RADAR input is associated with a sensor velocity module configured to estimate velocity from the RADAR input.

In some implementations of the example autonomous vehicle, the localization filter includes a Kalman filter.

Other example aspects of the present disclosure are directed to other systems, methods, vehicles, apparatuses, tangible non-transitory computer-readable media, and devices for localizing an autonomous vehicle.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems. As used herein, "about" in conjunction with a stated numerical value is intended to refer to within 20 percent of the stated numerical value, except where otherwise indicated.

Figure 1:
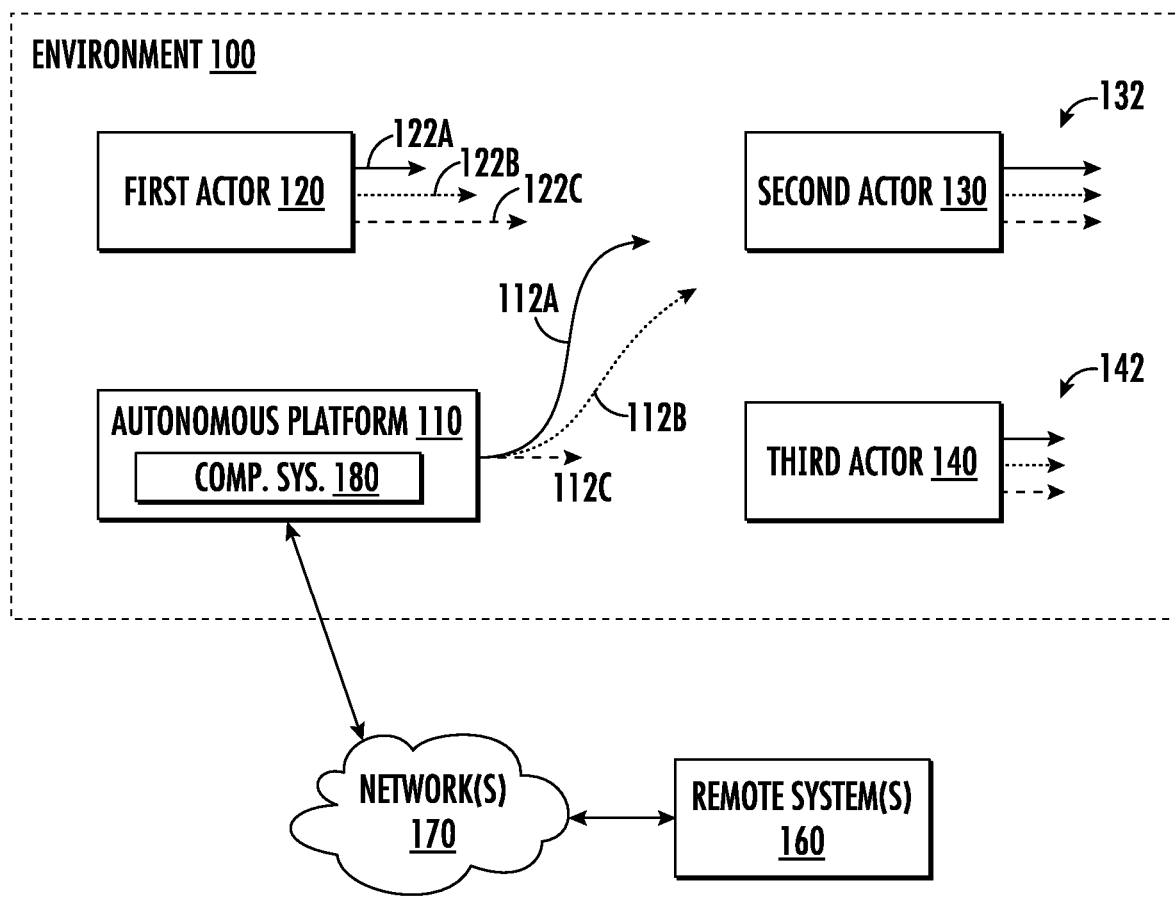
FIG. 1 is a block diagram of an example operational scenario, according to some implementations of the present disclosure.

With reference to FIGS. 1-10, example embodiments of the present disclosure are discussed in further detail. FIG. 1 is a block diagram of an example operational scenario according to example implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 can be or include an indoor environment (e.g., within one or more facilities, etc.) or an outdoor environment. An indoor environment, for example, can be an environment enclosed by a structure such as a building (e.g., a service depot, maintenance location, manufacturing facility, etc.). An outdoor environment, for example, can be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 can be any type of platform configured to operate within the environment 100. For example, the autonomous platform 110 can be a vehicle configured to autonomously perceive and operate within the environment 100. The vehicles can be a ground-based autonomous vehicle such as, for example, an autonomous car, truck, van, etc. The autonomous platform 110 can be an autonomous vehicle that can control, be connected to, or be otherwise associated with implements, attachments, or accessories for transporting people or cargo. This can include, for example, an autonomous tractor optionally coupled to a cargo trailer. Additionally or alternatively, the autonomous platform 110 can be any other type of vehicle such as one or more aerial vehicles, water-based vehicles, space-based vehicles, other ground-based vehicles, etc.

The autonomous platform 110 can be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) can be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s). In particular, according to example aspects of the present disclosure, the autonomous platform 110 can localize itself with respect to the environment 100 or with respect to the object(s) in the environment 100.

Figure 2:
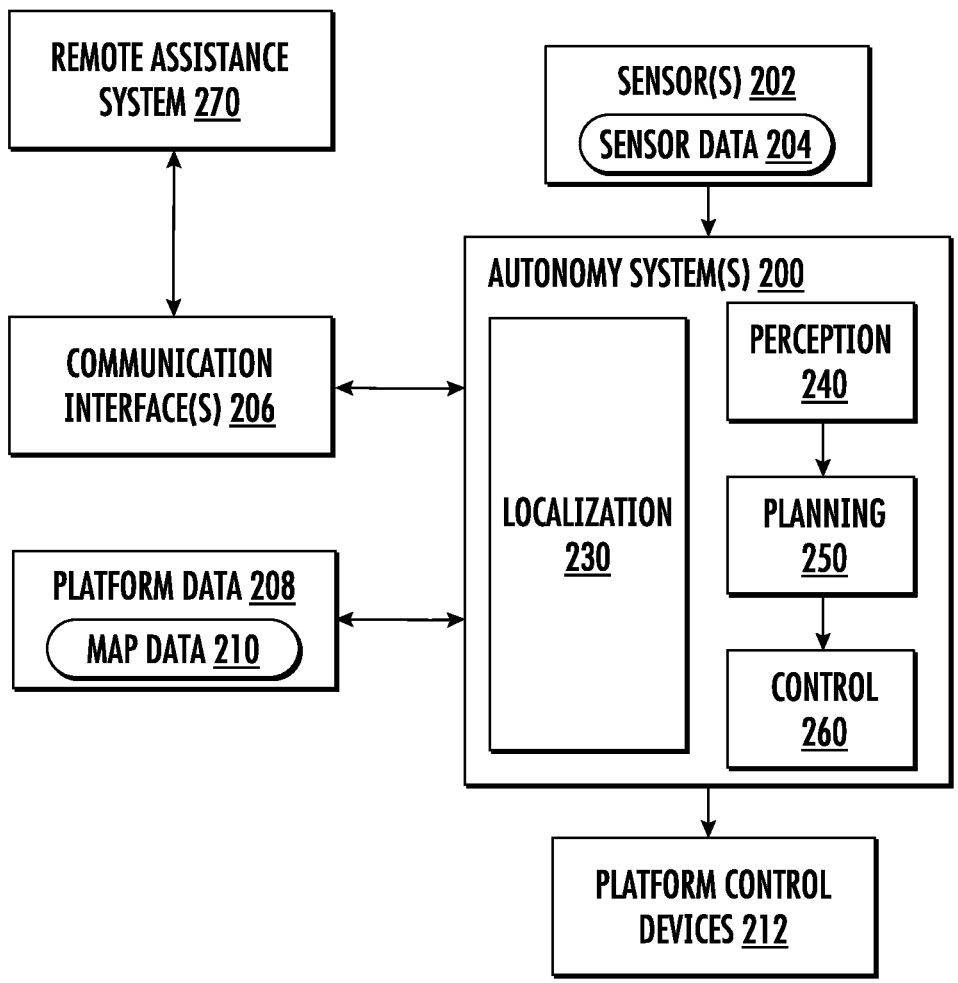
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 can include different subsystems for performing various autonomy operations. The subsystems can include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment can be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors 202, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230 (e.g., a pose estimation system), which can provide an autonomous platform with an understanding of its location and orientation in an environment (its "pose"). In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.), also referred to as "global pose," or relative position (e.g., respecting an initial position of the autonomous vehicle, etc.), also referred to as "local pose." For instance, the local pose can be defined relative to a coordinate frame or frame of reference established with respect to the initial position of the vehicle and updated as the vehicle moves relative to its initial position. The local pose can be consistent over short timeframes, such as timeframes on the order of several seconds. The local pose may be periodically refreshed. For instance, periodically refreshing the local pose may help mitigate the effects of pose drift over time. The global pose may instead be defined relative to a global coordinate system, such as a tiled map grid.

The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system (e.g., a global navigation satellite system (GNSS) such as GPS, BeiDou, GLONASS, Galileo, etc.), radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy can be a set of discrete decisions (e.g., yield to actor, reverse yield to actor, merge, lane change) that the autonomous platform makes. The strategy can be selected from a plurality of potential strategies. The selected strategy can be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger can be an alert, an error signal, a map feature, a request, a location, a traffic condition, a road condition, etc.

After initiating the session, the autonomy system 200 can provide context data to the remote assistance system 270. The context data can include sensor data 204 and state data of the autonomous platform. For example, the context data can include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
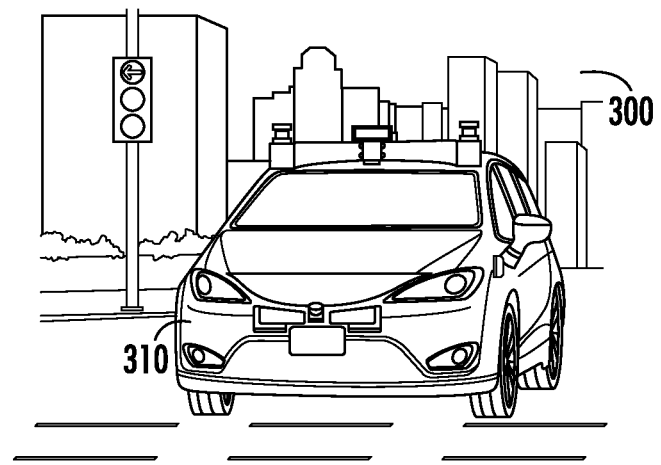
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
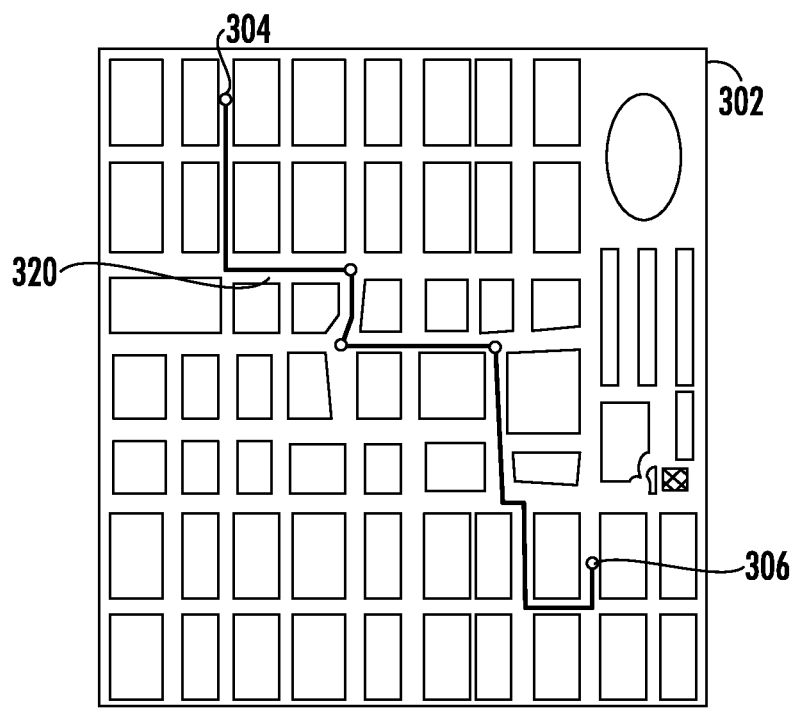
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
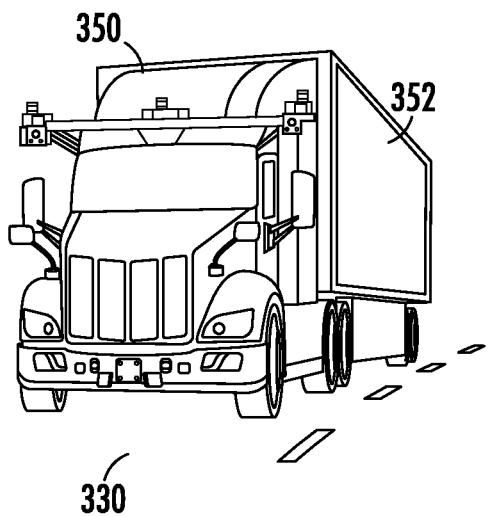
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
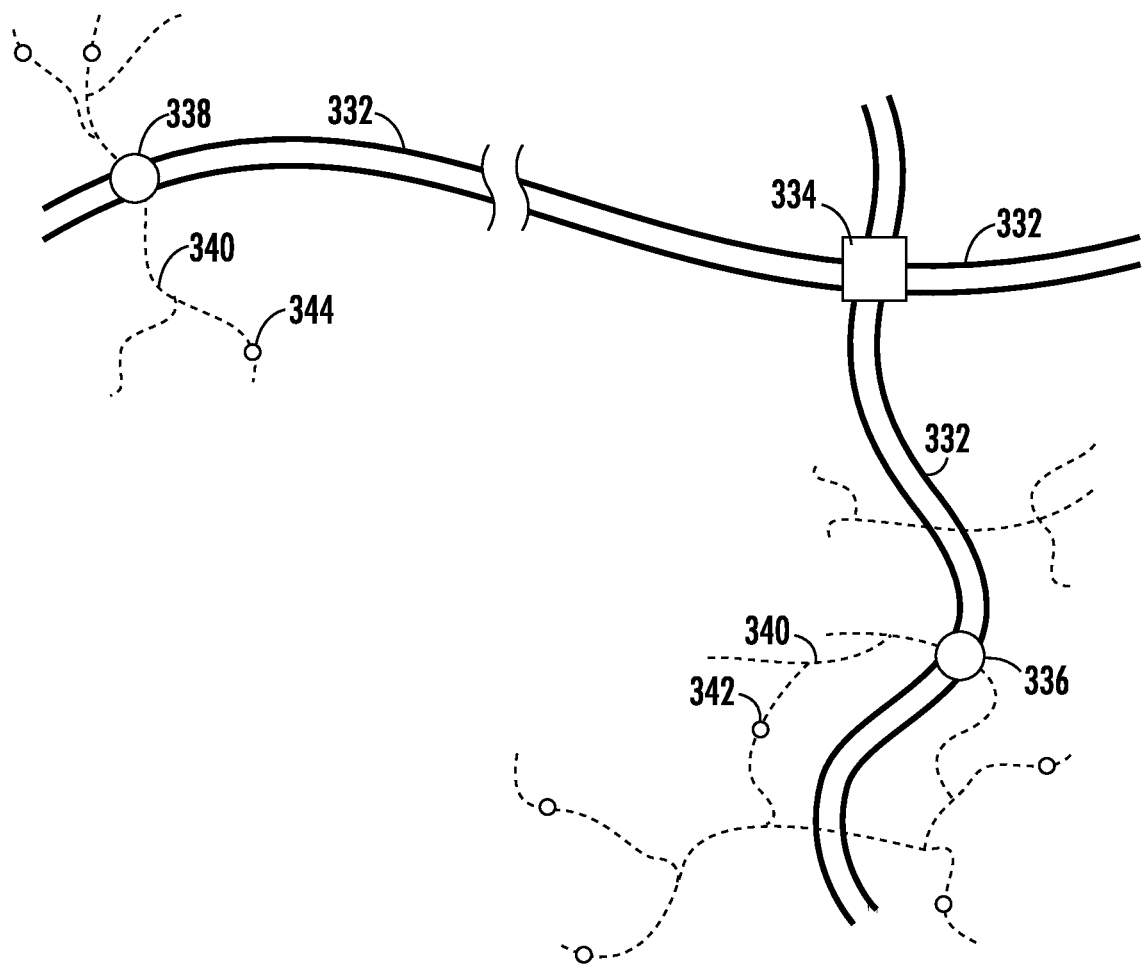
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To help improve the performance of an autonomous platform, such as an autonomous vehicle controlled at least in part using autonomy system(s) 200 (e.g., the autonomous vehicles 310 or 350), systems and methods according to example aspects of the present disclosure can provide for improved localization of an autonomous platform within its environment. In particular, the systems and methods disclosed herein can employ a pose estimation system having a localization filter. The localization filter can provide for the pose estimation system to reason about the pose of the autonomous platform from multiple sensor inputs or other sources of input. This can provide for improved localization accuracy or more robust outputs from the localization system.

Figure 4A:
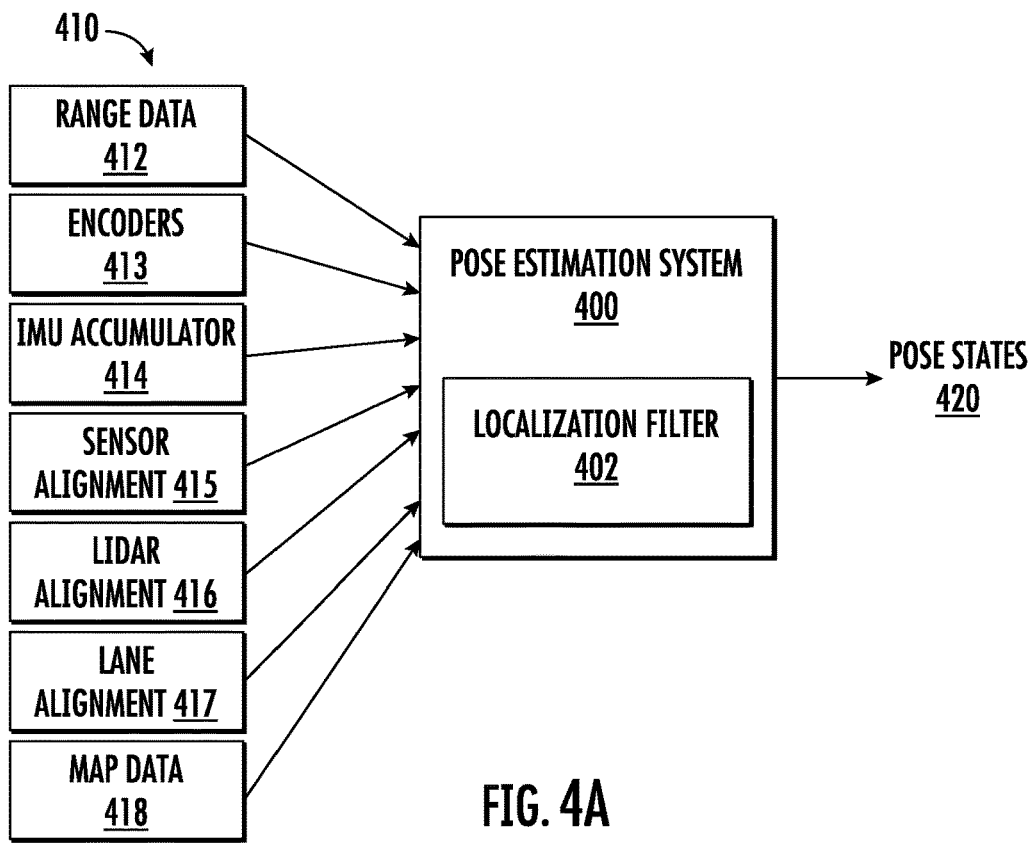
FIG. 4A is a block diagram of an example pose estimation system, according to some implementations of the present disclosure.

FIG. 4A is a block diagram of a pose estimation system 400, according to some implementations of the present disclosure. The pose estimation system 400 can produce pose states 420, as described herein. In particular, the pose estimation system 400 can employ a localization filter 402. One example of a localization filter 402 is a Kalman filter. A Kalman filter, or linear quadratic estimation filter, is an algorithm utilizing a series of measurements over time (which can include noise, biases, or other inaccuracies) to produce estimates of other, unknown variables. The Kalman filter can estimate a joint probability distribution over the variables at each time frame. The Kalman filter can employ a two-phase prediction process, in which the filter produces initial estimates of current state variables and uncertainties, then updates these estimates with a weighted average after the next measurement is observed. The use of a Kalman filter can provide for processing several measurements in real time, which is beneficial for autonomous platform navigation tasks.

In some implementations, the localization filter 402 can be or can include one or more parallel filters. For instance, in some implementations, the localization filter 402 can include a local pose filter configured to output a local pose estimate or a global pose filter configured to output a global pose estimate. The use of parallel filters can provide for improved insulation of the local pose state. Additionally or alternatively, the localization filter 402 can be or can include a combined filter. For instance, in some implementations, the localization filter 402 can be a single filter configured to output pose states 420 including both local pose and global pose. The use of a combined filter can provide an improved sensor fusion framework, along with improvements to computing technology such as reduced computational requirements or reduced memory resources dedicated to recording data.

The localization filter 402 can consume inputs 410 from a plurality of sensor systems or other onboard systems on an autonomous vehicle (e.g., autonomous vehicle 310) to produce the pose states 420. The inputs 410 can include any suitable inputs from any suitable systems onboard or in communication with an autonomy system (e.g., autonomy system 200) such as, for example, range data 412 (e.g., from a LIDAR system or RADAR system), doppler data encoding velocities associated with the range data 412 (e.g., doppler RADAR data and/or doppler LIDAR data), encoder inputs 413 (e.g., from wheel encoders), an IMU accumulator input 414 (e.g., from an IMU accumulator system), sensor alignment data 415, LIDAR alignment data 416 (e.g., from a LIDAR alignment tracking module), lane alignment data 417 (e.g., from a lane alignment tracking module), map data 418, such as one or more map tiles (e.g., from a map data server, a global navigation satellite system (GNSS), etc.), and/or doppler data associated with the map data 418 (e.g., doppler data from a satellite system).

The LIDAR alignment data 417 can provide a three-dimensional geometric registration of LIDAR returns with respect to registered surface elements (surfels) in a given map tile. For instance, a LIDAR alignment module can receive a measurement of global pose from a three-dimensional transformation of a tile from sensor state. The transformation can be a homogenous transformation of the pose of a given tile frame from an estimated LIDAR frame. The LIDAR alignment module can determine the location of LIDAR points with respect to the transformed global pose.

The lane alignment data 417 can be a three-dimensional geometric registration of detected lane line points (e.g., lane boundaries) with respect to annotations in a map tile. For instance, a lane alignment module can receive a measurement of global pose from a three-dimensional transformation of a tile from sensor state. The transformation can be a homogenous transformation of the pose of a given tile frame from an estimated LIDAR frame. The lane alignment module can determine the location of lane line points with respect to the transformed global pose.

The pose states 420 can include at least a local pose. As used herein, a "local pose" can be defined relative to an initial position of an autonomous vehicle. The local pose can be consistent over short timeframes, such as timeframes on the order of several seconds. The local pose may be periodically refreshed. For instance, periodically refreshing the local pose may help mitigate the effects of pose drift over time. The local pose can be defined relative to a local frame. The local frame can reflect the initial position and/or heading of the autonomous vehicle. The Z-axis of the local frame can be aligned with gravity. Additionally or alternatively, the X-axis and/or Y-axis of the local frame can generally be aligned with dimensions of freedom over which the autonomous vehicle may travel (e.g., the ground).

In some implementations, the local pose published as the pose states 410 can be formed by integrating an estimated velocity state in the localization filter 402. Integrating the estimated velocity state to determine the local pose state can provide for continuity of local pose position states even in the presence of arbitrarily large jumps in map-tile-relative states. The pose state can be formed by combining roll and pitch from the localization filter 402 with position and heading of a previous local pose transform, then integrating the estimated body-fixed velocity states from the localization filter 402 to produce a new local pose transform.

Additionally or alternatively, the pose states 420 can include a global pose. The global pose can be defined relative to a global metric. As one example, the global pose can be defined relative to one or more coordinates. As another example, the global pose can be defined relative to a tiled global map. The tiled global map can include map data defined relative to one or more "map tiles" or simply "tiles" that encompass sections of the overall map. For instance, a larger map or atlas can be segmented into a plurality of map tiles that each cover a subset of the larger map or atlas. In this way, analysis of objects on a global map can be focused on objects that are within a proximate frame of reference. The global pose can be defined relative to a tile frame. Each tile in the tiled global map can include a respective origin, and the global pose of the vehicle can be estimated with respect to a given tile frame in which the vehicle is located. Global pose can be used to place map content into the local or vehicle frame.

The localization filter 402 can perform covariance gating to fuse the inputs 410 from multiple sources. Covariance gating is used to determine the likelihood of a measurement given an internal state of the localization filter 402 (e.g., based on previous measurements and the dynamic model(s) of the localization filter 402) that is compared to a gating threshold to determine whether the measurement is erroneous or not. For example, if one input 410, such as LIDAR alignment 416, produces measurements for a given state (e.g., tile-from-vehicle) that do not agree with other inputs 410 such as sensor velocities, lane alignment 417, IMU accumulator data 414, and so on, the likelihood of the disagreeing input 410 can be beyond the gating threshold. A measurement that is beyond the gating threshold can be flagged as erroneous and/or may not be fused with other measurements from the system.

For instance, in some implementations, the localization filter 402 can maintain an estimate of quantities such as mean and covariance of a filter state x. The estimate can be determined according to:

$$P = E[(x \ominus \hat{x})(x \ominus \hat{x})^T]$$

where $\hat{x}$ is the estimated value of the filter state, x is the true value of the filter state, and $\ominus$ is the generalized difference, where the group logarithm is used to difference non-vector members of the state. These two estimates can parameterize a multivariate normal distribution (MVN), $N(\hat{x}, P)$. The localization filter 402 can produce an estimate of this MVN using one or more models. This estimate can be recursively updated. Additionally or alternatively, this estimate can be dependent on previous measurements and inputs. In some implementations, higher modes of this MVN may be omitted to improve processing efficiency.

Furthermore, measurements may be modeled with an estimate similar to that of the filter states. For instance, a measurement may be modeled by:

$$R = E[(z \ominus \hat{z})(z \ominus \hat{z})^T]$$

where $\hat{z}=h(\hat{x})$, where h is a nonlinear function that maps an estimated state (e.g., $\hat{x}$) to the predicted measurement.

A likelihood of a given measurement under the above conditions given a state distribution (also referred to as a prior belief) and a measurement distribution can be computed according to:

$$P(z | \hat{x}) \propto d = r^T(HPH^T + R)^{-1}r,$$

where H, or measurement Jacobian, is $$H = \frac{\partial h}{\partial x}$$

and r, or residual vector, is the difference between the actual measurement and the predicted measurement given the current state estimate, or $r=z-h(\hat{x})$.

Because this quantity can represent the combination of two multivariate normal distributions, the Mahalanobis distance d can behave according to an $\chi^2$ distribution with degrees of freedom equal to the tank of the residual vector r. The Mahalanobis distance d can therefore be used to compute the probability of a measurement represented by its distance from a distribution. For instance, the gating threshold can specify a limit on the size of the Mahalanobis distance d. For instance, measurements having a value for d that exceeds the gating threshold can be gated or ignored. In some implementations, measurements from the IMU may not be gated.

Figure 4B:
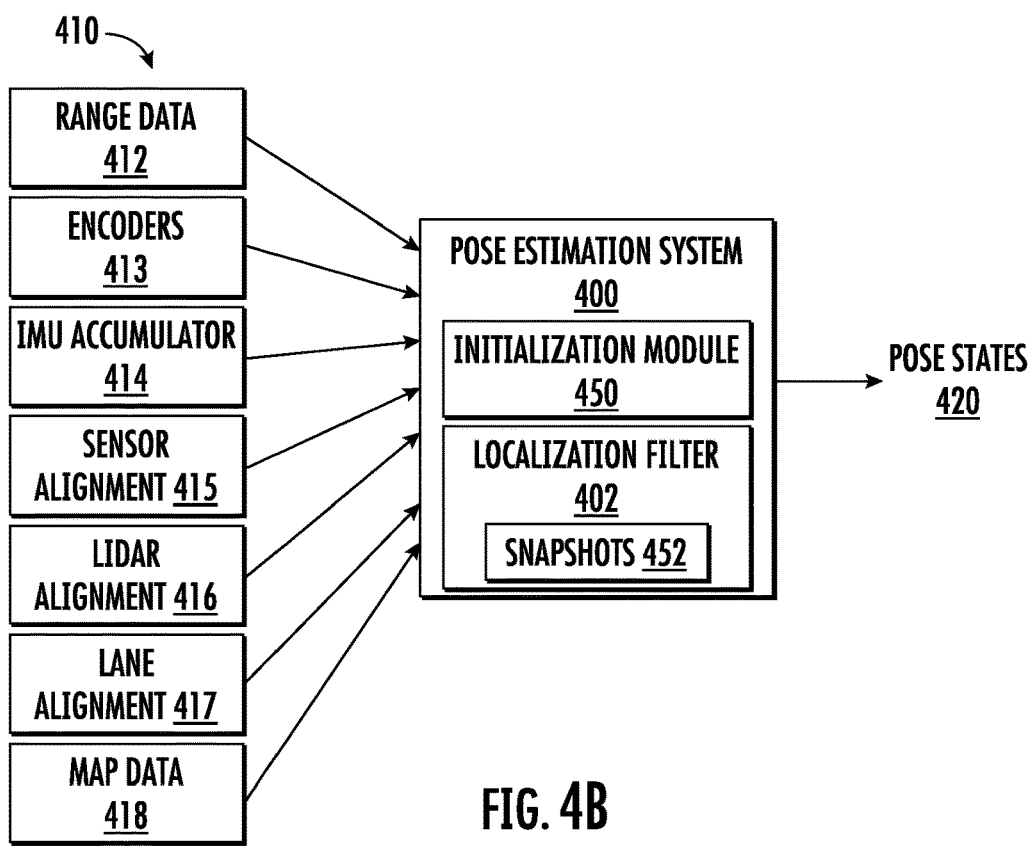
FIG. 4B is a block diagram of an example pose estimation system, according to some implementations of the present disclosure.

FIG. 4B is a block diagram of a pose estimation system 400, according to some implementations of the present disclosure. The example pose estimation system 400 includes an initialization module 450. The initialization module 450 can be configured to initialize the localization filter 402 before data is available from the inputs 410. In some implementations, the initialization module 450 can initialize the local IMU state to the vehicle IMU state. The initialization module 450 can initialize any IMU biases or extrinsic perturbations to zeroes. The initialization module 450 can "reset" the map IMU state (e.g., such that the state is not tracking a map tile). The initialization module 450 can also initialize velocities to those estimated from wheel encoders (e.g., without lateral or vertical velocity). To initialize LIDAR alignment, such as in the case of an initial measurement or recovery from a prolonged outage, the initialization module 450 can copy the LIDAR alignment state from an initial LIDAR alignment measurement with a tuned covariance. The covariance can be assumed to be diagonal in the sensor frame and transformed into the tile frame. An example state diagram depicting states that are followed for initializing a localization filter is discussed in greater detail with respect to FIG. 7.

Figure 4C:
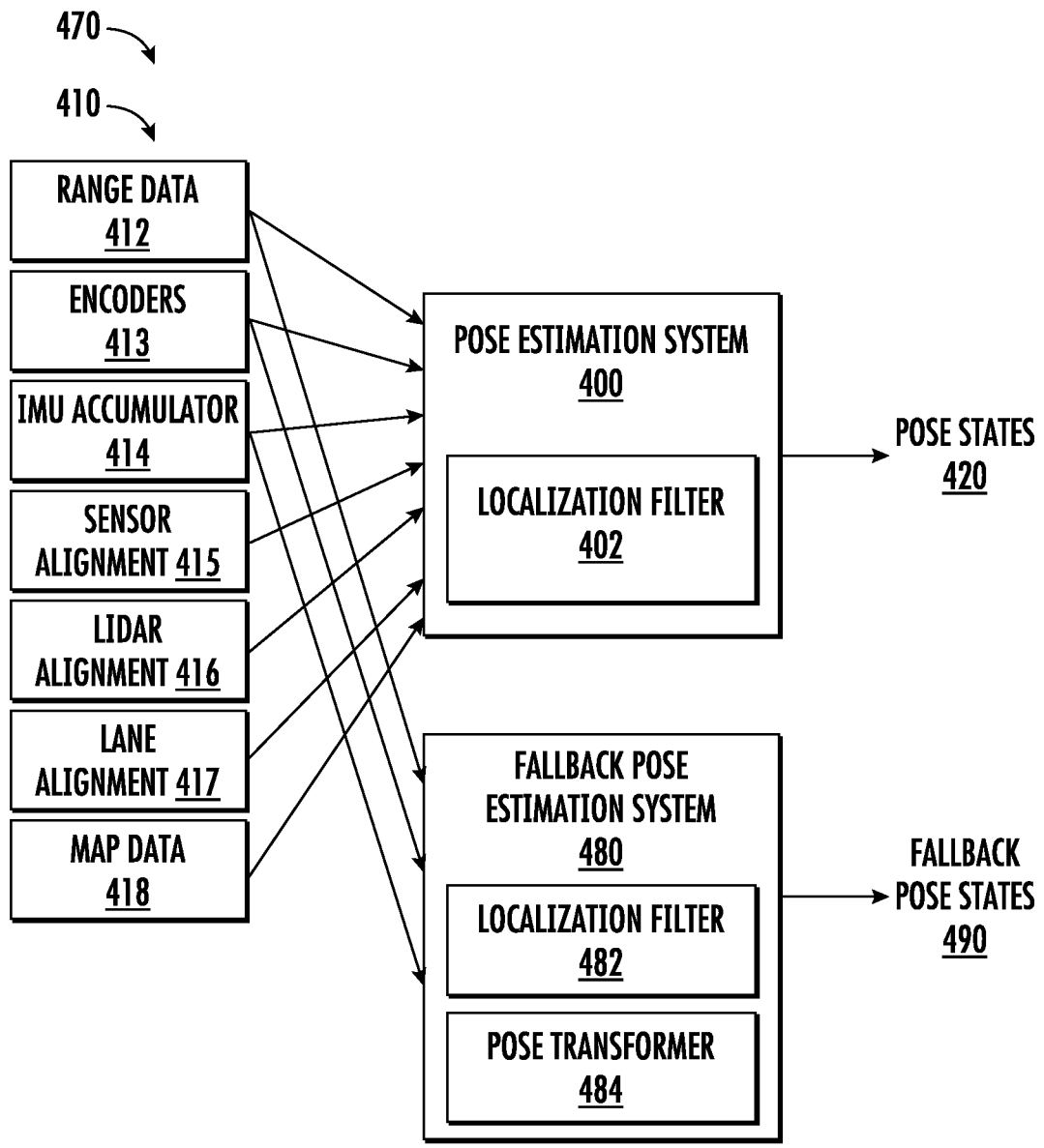
FIG. 4C is a block diagram of an example system, according to some implementations of the present disclosure.

FIG. 4C is a block diagram of an example system 470, according to some implementations of the present disclosure. The system 470 can include a pose estimation system 400 discussed with respect to FIGS. 4A and 4B. In addition to the pose estimation system 400, the system 470 can include a fallback pose estimation system 480. The fallback pose estimation system 480 can include a localization filter 482 that is similar to the localization filter 402 of the pose estimation system 400.

The fallback pose estimation system 480 can be configured to provide fallback pose states 490 in the event of a fallback condition, where pose states 420 (e.g., local pose states) may not be available from the pose estimation system 400. For instance, the fallback pose estimation system 480 may be configured to operate during anomalous operation of pose estimation system 400. The fallback pose states 490 may provide reduced information compared to the pose states 420. For instance, the fallback pose states 490 may provide for an autonomous vehicle to execute a low risk maneuver such as a stop maneuver or pullover maneuver. However, the fallback pose states 490 may be more robust to anomalous operation of some of the inputs 410.

The fallback pose estimation system 480 can consume some or all of the inputs 410 for the pose estimation system 400. For instance, the fallback pose estimation system 480 can consume a subset of the inputs 410. The subset of inputs 410 may include inputs that can be determined locally, such as range data 412, encoder data 413, IMU accumulator data 414, doppler data, sensor velocity data, etc. Additionally or alternatively, the subset of inputs 410 may not include inputs that are relative to map tiles, such as LIDAR alignment data 416, lane alignment data 417, map data 418, etc. Additionally or alternatively, the subset of inputs 410 may include inputs from fewer sensors onboard the vehicle (e.g., from only a subset of the RADAR or LIDAR sensors available onboard the vehicle).

To switch from utilizing the pose states 420 to the fallback pose states 490, an autonomous vehicle control system may transform the reference frames of the pose states 420 to the reference frames of the pose states 490 to provide continuous pose understanding. The fallback pose estimation system 480 can include a pose transformer 484 configured to publish transformations from the reference frames of the pose states 420 to the reference frames of the pose states 490. For instance, the transforms may compensate for desynchronization or other differences between the pose states 420 and fallback pose states 490.

Figure 5:
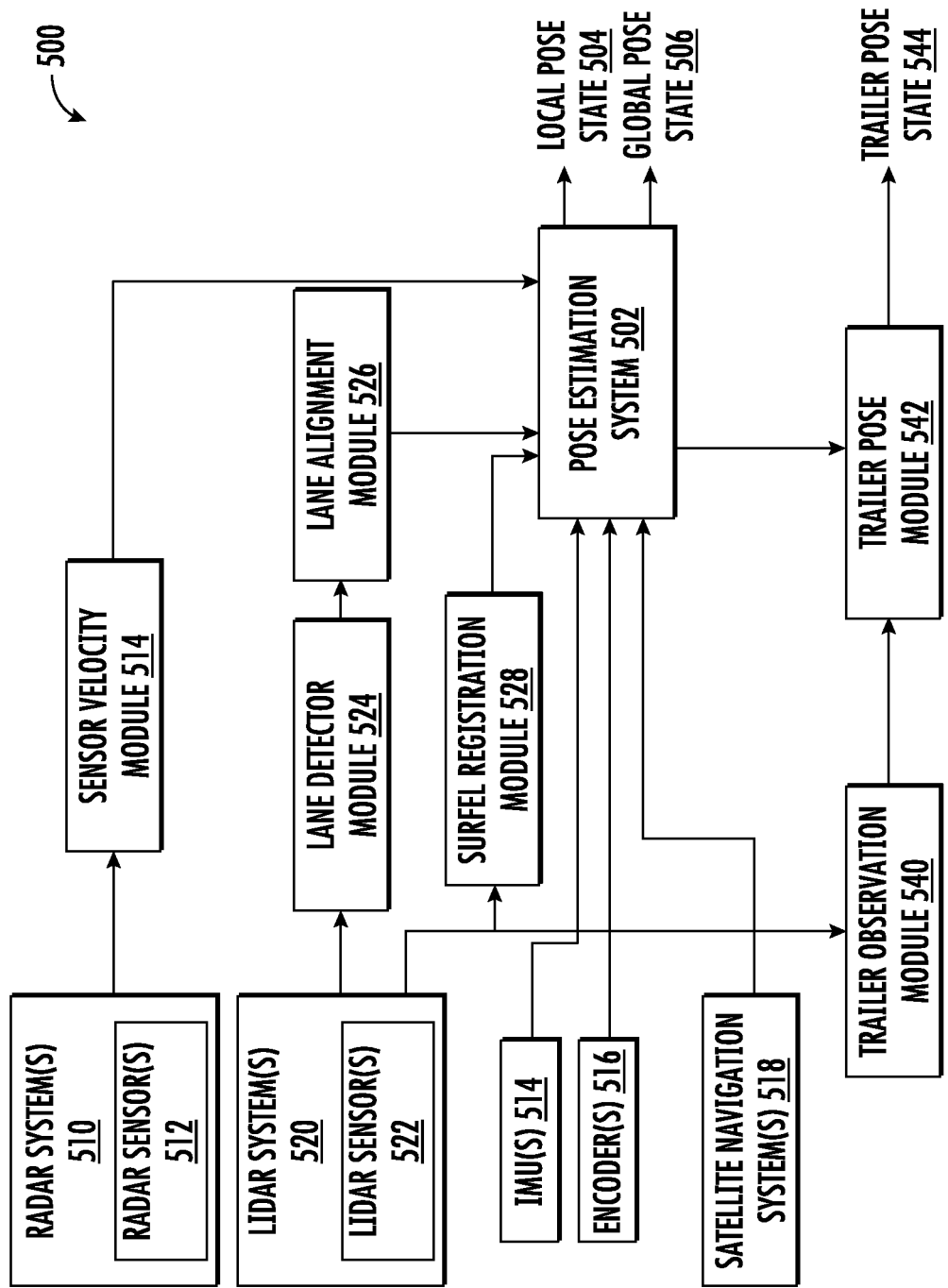
FIG. 5 is a block diagram of an example portion of an autonomous vehicle control system, according to some implementations of the present disclosure.

FIG. 5 is a block diagram of a portion of an autonomous vehicle control system 500, according to some implementations of the present disclosure. In particular, FIG. 5 depicts inputs and outputs of a pose estimation system 502 according to example aspects of the present disclosure. The pose estimation system 502 can be, for example, pose estimation system 400 of FIG. 4. The pose estimation system 502 can employ a localization filter to produce a local pose state 504 and/or a global pose state 506, as described herein. In addition to the localization filter, the pose estimation system 502 can include one or more measurement buffers, state machines, and/or other systems for fusing measurements from distinct input sources.

The system 500 can include one or more RADAR systems 510. Each RADAR system 510 can include one or more RADAR sensors 512. The RADAR systems 510 or RADAR sensors 512 can be positioned onboard an autonomous platform, such as an autonomous vehicle. For instance, each RADAR system 510 can have a field of view that covers a portion of an autonomous vehicle's environment. In some implementations, the RADAR system 510 can be or include Doppler RADARs.

The RADAR system(s) 510 or RADAR sensor(s) 512 can be associated with a sensor velocity module 514. The sensor velocity module 514 can be configured to estimate the velocity of the RADAR system 510 based on RADAR data from the RADAR sensors 512. For instance, the sensor velocity measurements can be the three-dimensional velocity of a given sensor with respect to the local frame or expressed in the sensor frame. These sensor velocity measurements can be computed from doppler readings of sensor returns (such as doppler RADAR or doppler LIDAR). In some implementations, a multiplicative bias may be applied to the sensor velocity measurements to compensate for any miscalibration of the RADAR system 510 (e.g., a RADAR array).

The velocity can be estimated with respect to the local frame. In some implementations, a common velocity common to each RADAR sensor 512 can be estimated for each RADAR system 510. For instance, a velocity may be estimated for a single RADAR sensor 512 and applied to each of the other RADAR sensor(s) 512, rather than computing a unique velocity for each RADAR sensor 512. Additionally or alternatively, in some implementations, a respective sensor velocity module 514 can be connected to a RADAR sensor 512 and configured to estimate a respective velocity for the connected RADAR sensor 512.

Additionally or alternatively, the system 500 can include one or more LIDAR systems 520. Each LIDAR system 520 can include one or more LIDAR sensors 522. The LIDAR systems 520 or LIDAR sensors 522 can be positioned onboard an autonomous platform, such as an autonomous vehicle. For instance, each LIDAR system 520 can have a field of view that covers a portion of an autonomous vehicle's environment. In some implementations, sensor velocity measurements may be associated with the LIDAR sensors 522.

The system 500 can also include one or more modules to extract geographic or other identifiers from the LIDAR data produced by the LIDAR system(s) 520. As one example, the system 500 can include a lane detector module 524. The lane detector module 524 can analyze the LIDAR data to detect and orient lane boundaries in the environment of the autonomous platform that are visible in the LIDAR data. The detected lanes can be passed to a lane alignment module 526. The lane alignment module 526 can align the detected lanes with respect to a sensor frame, such as the vehicle.

Additionally or alternatively, the system 500 can include a surfel registration module 528. As used here, a "surfel," or surface element, is a representative point surface, typically associated with color, lighting, texture, or other surface information, used to model a larger, more complex surface. The surfel registration module 528 can match LIDAR data from the LIDAR system(s) 520 to known surfels on a larger surfel map. For instance, the surfel registration module 528 can reconcile multiple views of LIDAR data in a consistent frame of reference based on the pose states of the autonomous vehicle and the distance between the autonomous vehicle and consistent features in the multiple views of LIDAR data.

Additionally or alternatively, the system 500 can include one or more inertial measurement units (IMUs) 514. The IMUs 514 can include accelerometers, gyroscopes, magnetometers, compasses, etc. to measure orientation, specific force, angular rate, or other motion characteristics of the autonomous platform. One example IMU includes a three-axis accelerometer and a three-axis rate gyroscope. The IMU can be connected over a vehicle bus (e.g., the vehicle's CAN bus). The axes can be sampled independently or together and provided as messages over the bus. For instance, the IMUs 514 can output IMU data. In some implementations, an IMU accumulator can be included to accumulate data from the IMUs 514 over time and generate a persistent orientation measurement based on transient signals from the IMUs 514.

Additionally or alternatively, the system 500 can include one or more wheel encoders 516. The wheel encoders 516 can generate encoder data descriptive of revolutions of wheels on the autonomous platform. For instance, the wheel encoders 516 can convey a number of revolutions (or partial revolutions) of wheels on the autonomous vehicle.

The system 500 can also communicate with one or more satellite navigation systems 518. The satellite navigation system(s) 518 can utilize one or more orbital satellites to provide geospatial positioning. Example satellite navigation systems 518 include global navigation satellite systems (GNSS) such as the Global Positioning System (GPS), GLONASS, Galileo, BeiDou, etc. Any suitable satellite navigation system can be employed in accordance with the present disclosure.

In some implementations, the satellite navigation system(s) 518 can provide a satellite doppler measurement for the pose estimation system 502. The satellite doppler measurement can be a measure of the doppler characteristics of the carrier phase signal received from a respective transmitting satellite. This doppler measurement can be directly proportional to the relative velocity between the transmitting satellite and a receiver (e.g., a GNSS receiver) onboard the vehicle. In some cases, the doppler measurement may be biased by a stochastically-wandering clock-rate error in the receiver. A receiver may have a respective bias that is applied to all measurements from that receiver. The bias may be relatively small (e.g., nanosecond-scale). This bias may be parametrized in the localization filter. For instance, the bias may be parameterized in units of meters-per-second by multiplying the receiver bias with the speed of light. Furthermore, this can counter round-off errors associated with comparing smaller (e.g., nanosecond-scale) values with other values in the localization filter having larger scales. The satellite navigation system(s) 518 can additionally provide an ephemeris from a respective satellite that can be used to determine the position and velocity of the respective satellite in an earth-centered, earth-fixed (ECEF) coordinate frame.

To fuse these measurements from the satellite navigation system(s), a clock rate bias state can be added for a respective receiver and an IMU from ECEF orientation state can be integrated with rigid body kinematics. These states can be used to predict the observed doppler value by determining the line-of-sight velocity to each satellite, compensating for the satellite's velocity according to the orbital parameters in the ephemeris, and adding the estimated clock-rate bias. A lightweight covariance gating procedure may be applied to these measurements to remove multipath effects and/or other unmodeled errors.

In some implementations, the system 500 can provide a trailer pose state 544 descriptive of a pose of a trailer coupled to an autonomous platform, such as a trailer of an autonomous truck. In some implementations, this functionality can be built directly into pose estimation system 502. Alternatively, in some implementations, the system 500 can include a trailer pose module 542 to produce the trailer pose state 544. The trailer pose module 542 can consume observations from a trailer observation module 540 configured to provide observations of the trailer. For instance, in some implementations, the trailer pose module 542 can fit a trailer plane to LIDAR point data extracted by the trailer observation module 540 to estimate the trailer pose states 544. For instance, when a trailer is captured in LIDAR point data, the point data corresponding to the trailer can generally resemble a plane positioned at a sidewall of the trailer. The trailer pose state 544 can be determined based on the orientation of the plane.

Figure 6:
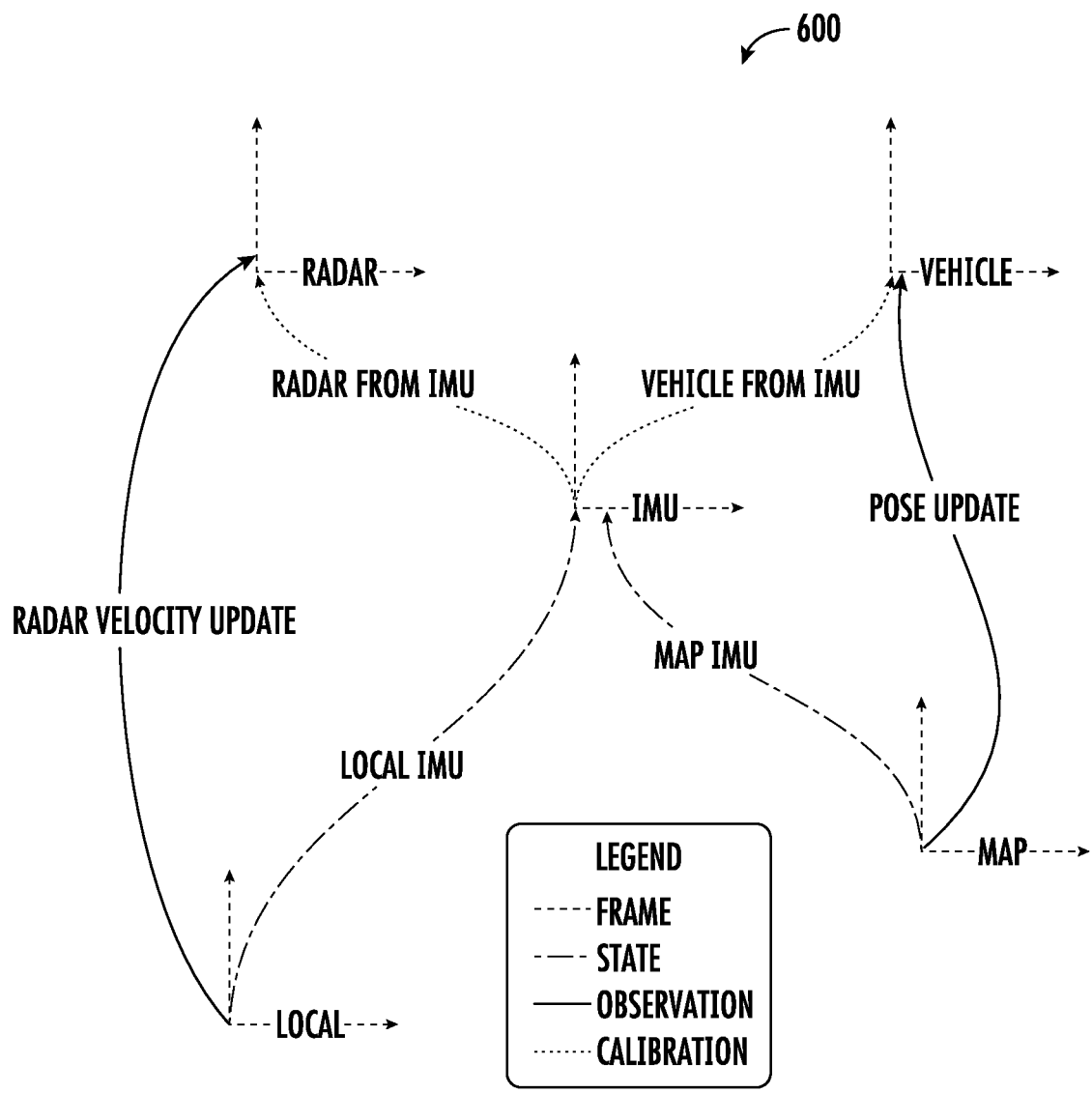
FIG. 6 is an example state diagram of a pose estimation system, according to some implementations of the present disclosure.

FIG. 6 is a state diagram 600 of a pose estimation system, according to some implementations of the present disclosure. The state diagram 600 depicts how a localization filter (e.g., localization filter 402) progresses through filter states and measurement updates during operation. It should be understood that the state diagram 600 is an example of how a localization filter can be implemented, and other filters having differing state progressions are contemplated within the scope of the present disclosure. A state machine can operate with respect to one or more coordinate frames. For example, the state diagram 600 depicts five example frames: a RADAR frame, an IMU frame, a vehicle frame, a local frame, and a map frame (also referred to herein as global frame, or tile frame). The local frame can be defined relative to an initial position and/or heading of the vehicle, where the z-axis of the frame is aligned with gravity. The map frame can be defined relative to an origin unique to each tile in a global map. The vehicle frame can be aligned relative to the center of a rear axle of the vehicle, with the x-axis facing forward and the z-axis facing up. The vehicle frame can be rigidly attached to an IMU. It should be understood that more, fewer, or different frames can be included in a localization filter without departing from the scope of the present disclosure.

The arrows in the state diagram 600 can indicate states, including a local IMU state and a map IMU state. The arrows in the state diagram 600 can also depict one or more observations, such as a radar velocity update and a pose update. Additionally or alternatively, the arrows in the state diagram 600 can also depict calibrations, such as the RADAR from IMU calibration and the vehicle from IMU calibration. The localization filter can account for small errors in sensor extrinsics (e.g., LIDAR-to-IMU extrinsics, RADAR-to-IMU extrinsics, etc.) by estimating deviations from the calibrated sensor extrinsics. Extrinsic correction states can also be associated with the calibrations. In addition to the local IMU, map IMU, and calibration extrinsic correction states shown in the figure, other states can include an IMU-frame velocity (e.g., shared for the local IMU and map IMU propagation); accelerometer and gyroscope biases; RADAR scale (e.g., a correction term for RADAR velocity fusion, such as doppler velocity fusion), and so on.

The local frame and map frame can be tracked independently in the localization filter. Zero-order pose updates can be applied with respect to the map frame, which can provide for a loose coupling between pose updates and the local IMU state. Additionally or alternatively, because the filter can maintain separate local IMU and map IMU frames, it can support local pose estimation even in the absence of vehicle from map pose updates, such as in cases where mapping data is being collected or if map data is otherwise unavailable.

In some implementations, the localization filter can estimate its inertial states with respect to the IMU frame. These IMU-frame states can be transformed to the vehicle frame when publishing local pose. In other words, some inertial state calculation can be done with respect to the IMU, and then transformed to the vehicle frame when needed. This can be contrasted with approaches where states are estimated directly in the vehicle frame.

The localization filter can be mechanized by the IMU inputs. For instance, the localization filter can utilize bias-corrected IMU measurements to integrate the pose and velocity states. The localization filter can then fuse inputs such as LIDAR alignments, sensory velocity measurements, etc. as observations. For instance, the localization filter can employ three-dimensional kinematics driven by a mechanization propagation model.

In some implementations, the localization filter can utilize an IMU-mechanization propagation model having kinematic integration of accelerometer and gyroscopic measurements. This can be contrasted with some approaches where a localization filter uses a constant acceleration (e.g., both linear and angular) propagation model. In some implementations, IMU-mechanization propagation models can have improved filter accuracy and stability, such as during high-acceleration events (e.g., driving over potholes). In some cases, the use of the IMU-mechanization propagation models can be used as a substitute for states such as angular velocity, acceleration, or angular acceleration states that some filters can use. For instance, in some cases, the localization filter can publish angular velocity from bias-corrected gyroscope measurements or acceleration from accelerometer measurements with bias, gravity, and Coriolis compensation. The resulting angular velocity state can thus closely mirror a conventional angular velocity state. In some implementations, angular acceleration can be ignored (e.g., published as zero). For instance, in implementations with little or no onboard consumers of acceleration states, the resulting acceleration state (and zero angular acceleration state) can be more kinematically consistent with the velocity states than some conventional approaches.

In some implementations, the localization filter can fuse zeroth-order pose updates (e.g., LIDAR alignment and lane alignment) in the same filter that produces the local pose estimate. This can be contrasted with some approaches, which intentionally keep these updates separate. The fusion of zeroth-order pose updates can have a number of benefits, such as improved localization accuracy as described herein. In some implementations, the localization filter can avoid the zero-transverse velocity and zero-vertical velocity synthetic observations that are used in some existing filters. For instance, in some cases, these models can include approximations having some error, and so reducing the reliance on these models (e.g., the transverse velocity observation) can be beneficial. Additionally or alternatively, reducing reliance on zeroth-order pose updates can reduce the impact of zeroth-order updates that can cause "jumps" in the pose, which can improve the "smoothness" (e.g., continuity) of the pose state over time.

In some implementations, the local IMU filter state (e.g., transformed into the vehicle frame) can not be published directly. Instead, a velocity state and a bias-corrected gyro measurement can be integrated outside of the filter to produce a continuous local IMU state. Some qualities, such as roll and pitch, can be overwritten from the local IMU filter state (e.g., to maintain accurate gravity alignment of the local frame), then the continuous local IMU state can be published as the local pose (e.g., after transforming into the vehicle frame). This approach can greatly reduce occurrences of jumps in the local pose position, heading states, and velocity states.

In some example implementations, filter states of a localization filter can include an IMU from local state, an IMU from map tile state, a velocity state (e.g., in an IMU frame), IMU biases, LIDAR extrinsics, RADAR extrinsics, or a Doppler scale. As used herein, a state "from" a first system to a second system refers to a filter state that transforms between the coordinate frame of the first system to the coordinate frame of the second system. For example, the IMU from local state transforms from the local frame to the IMU frame. In particular, the IMU from local state can be a rigid transform of the position and rotation of the vehicle IMU with respect to the local coordinate frame. As another example, the IMU from tile state can be a rigid transform of the position and rotation of the vehicle IMU with respect to the tile coordinate frame. Additionally or alternatively, the velocity state can be a first derivative of a position state in the IMU from local state. This velocity state can be the negative velocity in the IMU frame with respect to the local frame.

In some example implementations, a propagation model of a localization filter can be an IMU mechanization propagation model. In some example implementations, measurement updates for a localization filter include LIDAR alignment, lane alignment, or RADAR velocity (e.g., Doppler RADAR velocity). In some example implementations, synthetic observations for a localization filter can be limited to a self-position/heading (decorrelation) observation. In some example implementations, out-of-order measurement processing can be performed by a measurement buffer or buffer of filter state snapshots. After each delayed measurement, the snapshot buffer can be rewound to the point where the delayed measurement should have been processed, and newer measurements can be reprocessed up to a current time step.

Figure 7:
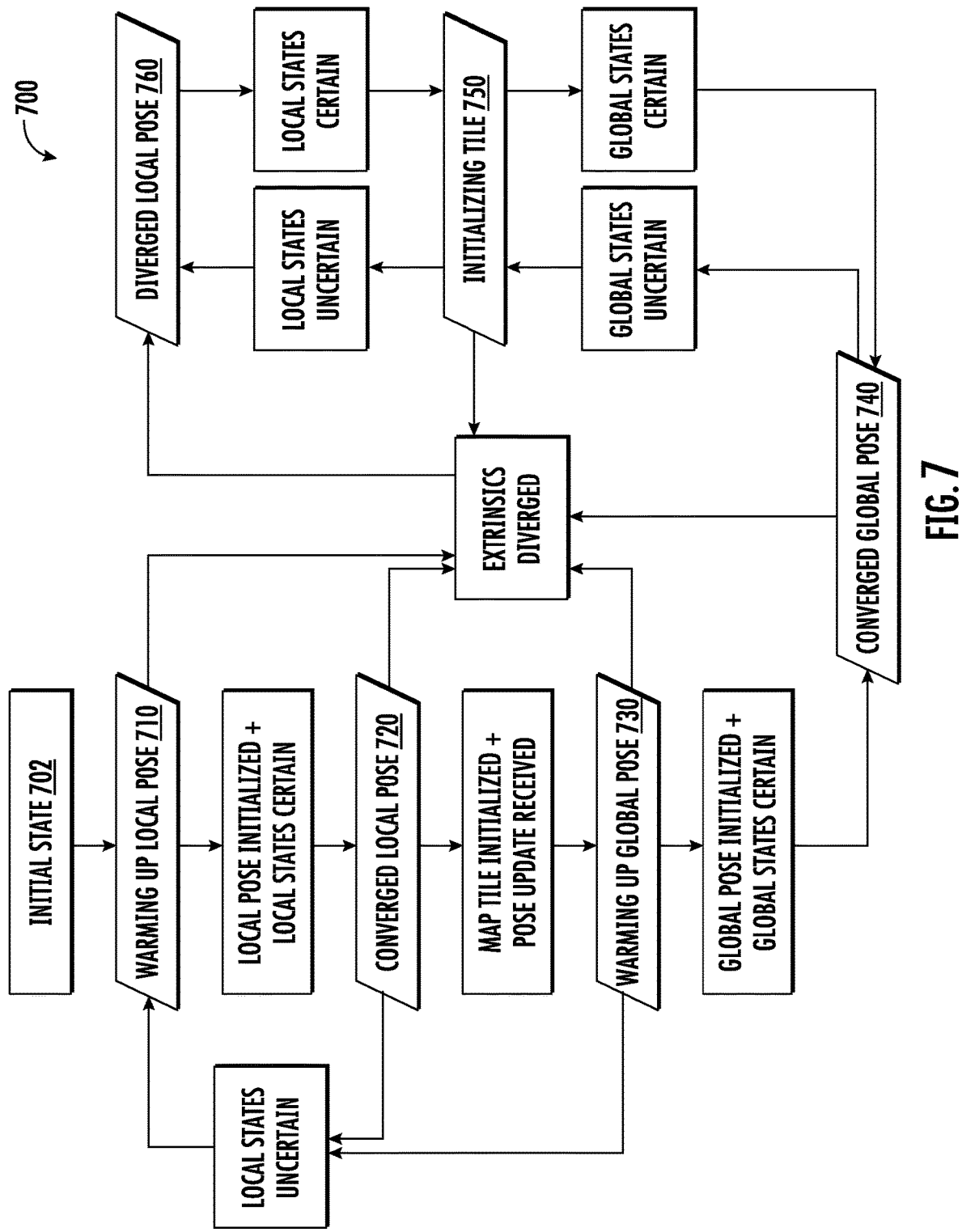
FIG. 7 is a state diagram flowchart of a localization filter, according to some implementations of the present disclosure.

FIG. 7 is a state diagram flowchart 700 of an example localization filter, according to some implementations of the present disclosure. For instance, in some implementations, the localization filter can have a finite state machine representative of a mode of the localization filter. At 702, an initializer can provide an initial state of the finite state machine. For instance, the state diagram can begin progressing when an initializer has provided an IMU measurement, wheel encoder measurement, or sensor velocity measurements to generate an initial state. Once the initial state is obtained, the localization filter can move to a warming up local pose state 710. In the warming up local pose state 710, IMU biases and velocity can be in the process of converging to acceptable values. At this state, extrinsics and tile estimation can be disabled, as pose measurements have not been accepted yet. Additionally or alternatively, vertical velocity constraints can be required. For instance, the vertical velocity may be constrained at zero for ground-based autonomous vehicles. Sensor velocity gating can also be disabled such that the sensor velocities are published to downstream modules (e.g., the localization filter).

From the warming up local pose state 710, the localization filter can move to the converged local pose state 720. For instance, once the localization filter has initialized, the localization filter can move to the converged local pose state 720. In the converged local pose state 720, local pose state measurements may be published. At this state, inertial states can have converged, although global-pose-dependent measurements such as LIDAR alignment or Lane alignment may not yet be available. The localization filter may progress to the converged local pose state 720 once the local pose has been initialized and local states are certain. The local pose may be initialized if, for example, the minimum time for warming up local pose has elapsed and the system has initialized properly. For instance, the localization filter can check whether RADAR extrinsics, IMU biases, motion, etc. have converged to acceptable values. If these local state values become uncertain at the converged local pose state 720, the localization filter may return to the warming up local pose state 710 until the values have reconverged.

From the converged local pose state 720, the localization filter can progress to the warming up global pose state 730. For instance, the localization filter can progress to the warming up global pose state 730 once a map tile has initialized and an initial pose update has been received. At the warming up global pose state 730, extrinsics and map tile estimation can be enabled. Tile states useful for determining global pose may not have converged. Additionally, the localization filter can wait until a minimum time for warming up global pose has elapsed. If the local states become uncertain during the warming up global pose state 730, the localization filter may return to the converged local pose state 720 or the warming up local pose state 710. Once the global pose measurements have converged and the minimum time for warming up global pose has elapsed, the localization filter can progress to the converged global pose state 740. The converged global pose state 740 represents "regular" operation of the localization filter, where both local pose states and global pose states are reliable and published.

If, during the converged global pose state 740, the global states become uncertain, the localization filter can progress to the initializing tile state 750. For instance, the initializing tile state 750 may occur after a prolonged gap in tile-relative measurement (e.g., LIDAR alignment or Lane Alignment) or in the case of a recently recovered tile. Once the global states have reconverged to become certain, the localization filter can return to the converged global pose state 740. If, however, the local states become uncertain as well or during any point in the state diagram at which the extrinsics diverge, the localization filter can progress to the diverged local pose state 760. At the diverged local pose state 760, the velocity states have a low confidence. Once the local states have become certain again, the localization filter can progress to the initializing tile state 750 and eventually the converged global pose state 740.

Figure 8:
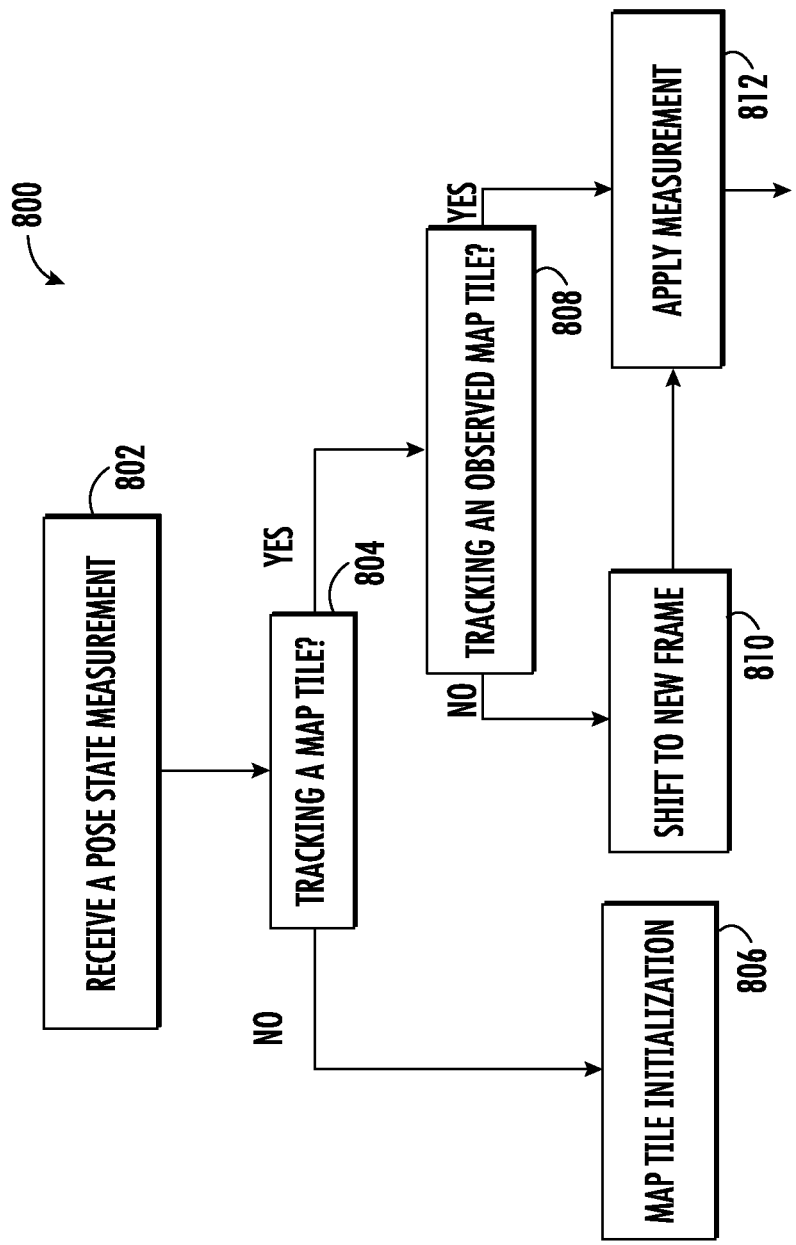
FIG. 8 is a flowchart diagram of an example process for applying a pose state measurement to a map tile, according to some implementations of the present disclosure.

FIG. 8 is a flowchart of a process 800 for applying a pose state measurement to a map tile, according to some implementations of the present disclosure. For instance, the localization filter (e.g., localization filter 402) can apply the process 800 when receiving a pose state measurement (e.g. if the filter is otherwise healthy). Many modules in the overall localization architecture (e.g., the system 500) can refer to an atlas or global tiled map for tile information. For instance, modules such as lane alignment and LIDAR alignment can respectively utilize independent map data, and can be synchronized with regard to which tile the autonomous vehicle is expected to be in at a given time. Accessing the global map can be a long-latency operation and can be performed without bottlenecking higher-frequency publication loops such as local pose publication. In some implementations, a tile selection module may be included to arbitrate which tile the vehicle is in at a given time and when the vehicle is expected to switch tiles. The predicted tile from the tile selection modules can be provided to other modules such that the tile selection is consistent across modules. The tile selection module can utilize pose state measurements (e.g., of local pose or global pose) from previous and current time steps to estimate a tile-relative vehicle position in a near future timestep.

At 802, the localization filter can receive a pose state measurement. At 804, the localization filter can determine whether it is currently tracking a map tile. For instance, the localization filter may not track a map tile for the first measurement. As another example, the localization filter may not track a map tile after a prolonged map outage or in another situation where map data is not available. At 806, if the localization filter is not tracking a map tile, the localization system can perform map tile initialization. For instance, map tile initialization can include resetting any cross-correlations or setting a state to measurement. At 808, if the localization filter is tracking a map tile, the localization filter can determine whether it is tracking an observed map tile. At 810, if the localization filter is not tracking an observed tile, the localization filter can shift to a new frame, such as a new frame covering the observed tile, and then apply the pose state measurement at 812. For instance, the map data can be used to estimate the pose of a new map tile from a converged pose of a previous tile. A tuned uncertainty or shift estimator can be used to adjust the initial pose. The measurement can then be applied to the adjusted map tile. If the localization filter is tracking an observed tile, it can progress directly to 812 from 808.

Figure 9:
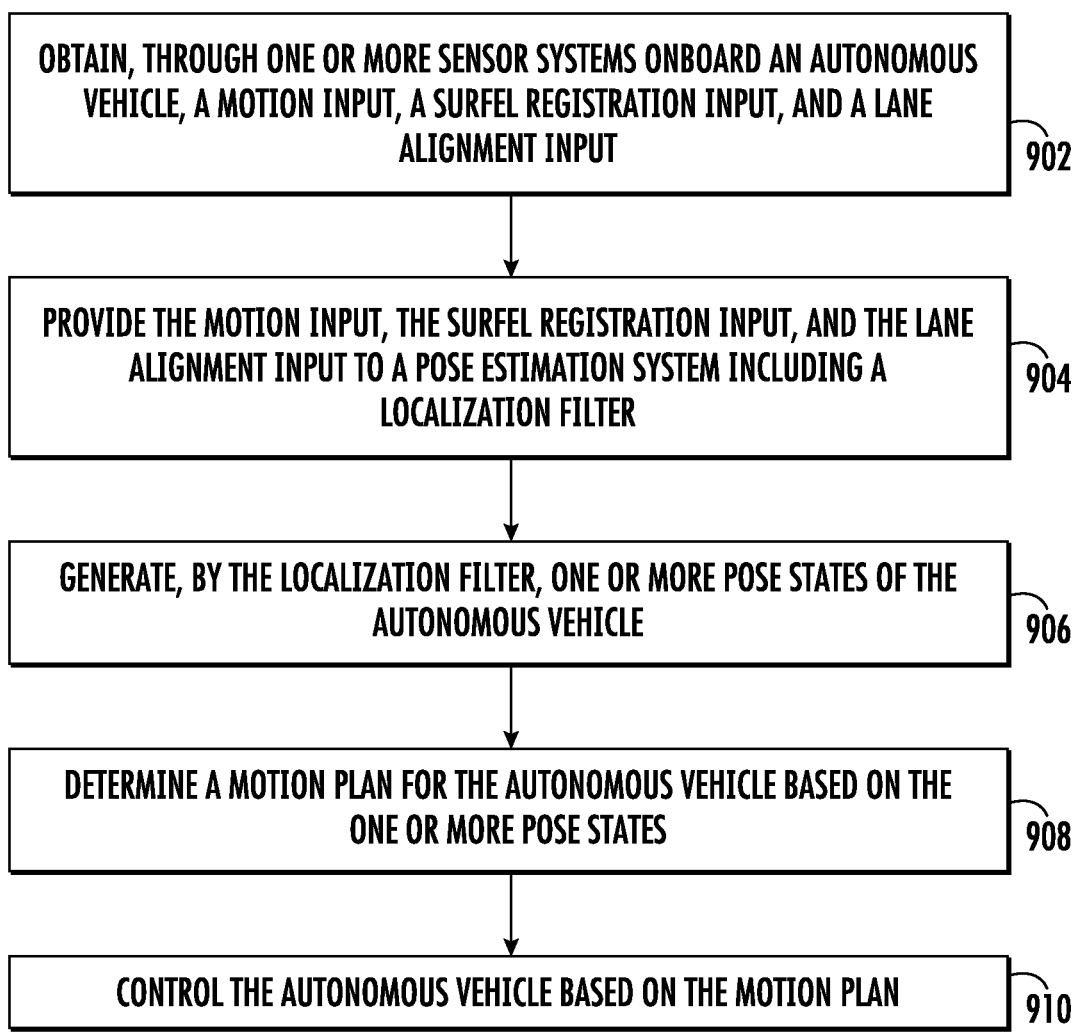
FIG. 9 is a flowchart of an example method for localizing an autonomous vehicle, according to some implementations of the present disclosure.

FIG. 9 is a flowchart of a method 900 for localizing an autonomous vehicle, according to some implementations of the present disclosure. One or more portion(s) of the method 900 can be implemented by a computing system that includes one or more computing devices such as, for example, the computing systems described with reference to the other figures (e.g., autonomous platform 110, vehicle computing system 180, remote system(s) 160, a system of FIG. 10, etc.). Each respective portion of the method 900 can be performed by any (or any combination) of one or more computing devices. Moreover, one or more portion(s) of the method 900 can be implemented on the hardware components of the device(s) described herein (e.g., as in FIGS. 1, 2, 10, etc.), for example, to validate one or more systems or models. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 902, a computing system can obtain, through one or more sensor systems onboard an autonomous vehicle, a motion input indicative of movement of the autonomous vehicle within the environment of the autonomous vehicle. The motion input can be any suitable input indicative of movement of the autonomous vehicle, such as a wheel encoder input, an inertial measurement unit (IMU) input, an IMU accumulator input, or any other suitable input. For instance, in some implementations, a sensor system can include an IMU, and the motion input can include data from the inertial measurement unit.

Additionally or alternatively, the computing system can obtain a surface element (surfel) registration input representing an alignment of one or more tracked surface elements in the environment of the autonomous vehicle. In particular, in some implementations, the surfel registration input can represent how well a surfel mapped in map data or other historical surfel data aligns with an observed surfel perceived by the sensors of the autonomous vehicle. For instance, a surface element registration module can register one or more surface elements in the environment of the autonomous vehicle (e.g., relative to a coordinate frame) based on the ranging data. As an example, the surface element registration module can register a persistent entity (e.g., a static object or feature in the environment and/or a dynamic feature persistent across multiple frames) corresponding to the surface element in a coordinate frame or reference frame descriptive of the environment. The surface elements can be tracked as the autonomous vehicle moves throughout its environment. For instance, a position of the persistent entity can be updated corresponding to the movement of the autonomous vehicle. This position can be compared to surfel data in map data representing known positions of surfels.

Additionally or alternatively, the computing system can obtain lane alignment input representing an alignment of one or more lane boundaries in the environment of the autonomous vehicle. In particular, in some implementations, the lane alignment input can represent how well a lane boundary mapped in map data or other historical lane boundary data aligns with an observed lane boundary perceived by the sensors of the autonomous vehicle. For instance, a lane alignment module can position lane boundaries within the environment of the autonomous vehicle (e.g., relative to a coordinate frame) based on the ranging data. As one example, the lane alignment module can fit or superimpose lane boundaries based on the ranging data.

At 904, the computing system can provide the motion input, the surfel registration input, and the lane alignment input to a pose estimation system. The pose estimation system can include a localization filter. The localization filter can provide a principled framework for estimating pose from multiple inputs. One example of a localization filter is a Kalman filter. A Kalman filter, or linear quadratic estimation filter, is an algorithm utilizing a series of measurements over time (which can include noise, biases, or other inaccuracies) to produce estimates of other, unknown variables. The Kalman filter can estimate a joint probability distribution over the variables at each time frame. The Kalman filter can employ a two-phase prediction process, in which the filter produces initial estimates of current state variables and uncertainties, then updates these estimates with a weighted average after the next measurement is observed. The use of a Kalman filter can provide for processing several measurements in real time, which is beneficial for autonomous platform navigation tasks.

In some implementations, the localization filter can be or can include one or more parallel filters. For instance, in some implementations, the localization filter can include a local pose filter configured to output a local pose estimate or a global pose filter configured to output a global pose estimate. The use of parallel filters can provide for improved insulation of the local pose state. Additionally or alternatively, the localization filter can be or can include a combined filter. For instance, in some implementations, the localization filter can be a single filter configured to output both local pose and global pose. The use of a combined filter can provide an improved sensor fusion framework, along with improvements to computing technology such as reduced computational requirements or reduced memory resources dedicated to recording data.

In some implementations, the pose estimation system can maintain one or more sensor extrinsics. The sensor extrinsics can specify positions of one or more sensors relative to the autonomous vehicle. For instance, the sensor extrinsics can be used to calibrate measurements from the sensors relative to the autonomous vehicle. The pose estimation system can observe non-trivial deviations from calibrated sensor extrinsics. It can be easier to observe sensor rotations compared to sensor position, leading to the observation of rotational change.

In some implementations, the motion input can be a sensor velocity, such as a RADAR velocity. For instance, in one example implementation, Doppler returns can be used to estimate the velocity of one or more RADAR systems with respect to a local frame of reference, such as a local frame of a localization filter. This velocity can be representative of a velocity of the autonomous platform. In some implementations, only one set of extrinsic states can be estimated for multiple RADAR systems. In some implementations, a single multiplicative bias can be estimated for aggregate returns.

At 906, the localization filter can generate one or more pose states of the autonomous vehicle. For instance, the localization filter can be a Kalman filter configured to generate the one or more pose states by predicting a distribution over the one or more pose states. The one or more pose states can include at least a local pose. As used herein, a "local pose" can be defined relative to an initial position of the autonomous vehicle. Additionally or alternatively, the one or more pose states can include a global pose. The global pose can be defined relative to a global metric. As one example, the global pose can be defined relative to one or more coordinates. As another example, the global pose can be defined relative to a tiled global map. The tiled global map can include map data defined relative to one or more "map tiles" or simply "tiles" that encompass sections of the overall map. For instance, a larger map or atlas can be segmented into a plurality of map tiles that each cover a subset of the larger map or atlas. In this way, analysis of objects on a global map can be focused on objects that are within a proximate frame of reference.

In some implementations, generating the one or more pose states can include aligning the one or more pose states to the one or more lane boundaries or the one or more tracked surface elements such that the one or more lane boundaries or the one or more tracked surface elements are consistent in a reference frame. For instance, the one or more pose states can represent an understood position of the autonomous vehicle within a reference frame. Other entities, such as the lane boundaries or tracked surface elements, can additionally be positioned within the reference frame. The pose of the autonomous vehicle can be aligned with the entities in the reference frame (e.g., the lane boundaries or tracked surface elements) such that the pose is consistent with the entities or the inputs to the pose estimation system.

In some implementations, the pose estimation system can maintain one or more prior pose states of the localization filter. For instance, the pose states can include one or more prior pose states. The pose estimation system can maintain one or more prior pose states of the localization filter. For instance, the pose estimation system can maintain a time-ordered snapshot buffer of prior pose states. Each "snapshot" in the buffer can include information about prior states, such as, for example, a timestamp, EKF state or covariance, associated inputs, tracked map tile identifiers, modes, etc. associated with a given snapshot. The snapshot buffer can allow the localization filter to recreate prior states at a current timestep.

In addition to maintaining one or more prior pose states, the snapshot buffer can be used to process out-of-order measurements and account for differing latencies across multiple inputs to the localization filter. For instance, when the localization filter receives a measurement associated with a prior timestamp, the localization filter can rewind the snapshot buffer to the state at the prior timestamp (assuming that the measurement is not so far out-of-order that the snapshot has been overwritten). For instance, in some implementations, the pose estimation system can receive an input corresponding to a prior pose state of the one or more prior pose states.

The pose estimation system can update the prior pose state based on the input. As one example, an input, such as a LIDAR alignment input, corresponding to a prior time stamp of 100 ms ago can be received by the pose estimation system at a current timestamp. The pose estimation system can store a snapshot of the state or other data regarding the localization filter at the prior time stamp (e.g., 100 ms ago). The pose estimation system can update the prior pose state based on the input, such as by recomputing the prior pose state as if the input was received at the prior timestamp. For example, if the input is a LIDAR alignment input, the pose estimation system can recompute the prior pose state (e.g., the local pose with respect to LIDAR points) based on the information in the input that is now available to the system.

The pose estimation system can then update the one or more (e.g., current) pose states based on the updated prior pose state. For instance, the pose estimation system can propagate the changes made to the prior pose state through a current timestamp by updating each intermediate state, in order, between the prior pose state and the current pose state(s). As one example, if the prior pose state was 100 ms prior and states are determined at 50 ms intervals, the pose estimation system would update the 100 ms prior state, then recompute the 50 ms prior state using the updated 100 ms prior state as a predecessor (e.g. as opposed to the state actually occurring 100 ms ago). The pose estimation system could then determine the updated current pose state, reflecting the changes made from the out-of-order input.

In some cases, the localization filter can be initialized, such as at startup of the autonomous vehicle or after a prolonged outage. For instance, the operations can further include estimating an initial pose state of the autonomous vehicle. In some implementations, the initial pose state can be estimated based on wheel encoder data from one or more wheel encoders positioned onboard the autonomous vehicle. For instance, the wheel encoder data can provide a simple yet reliable manner for configuring the localization filter before additional sensor measurements are available. Generating the one or more pose states can be based on the initial pose state. For instance, future pose states can propagate from the initial pose state once future measurements are received.

In some implementations, the computing system can further determine a trailer pose of a trailer of the autonomous vehicle based on the inputs to the pose estimation system. For instance, the autonomous vehicle can be an autonomous truck configured to tow a trailer. The autonomous truck can track its cab and trailer as unique actors. In some implementations, determining the trailer pose can include fitting a trailer plane to LIDAR point data to estimate the trailer pose. For instance, when a trailer is captured in LIDAR point data, the point data corresponding to the trailer can generally resemble a plane positioned at a sidewall of the trailer.

In some implementations, generating the one or more pose states can include selecting a map tile. For instance, the selected map tile can be used to determine a future global pose state relative to the selected map tile. Selecting the map tile can include obtaining a first map tile based on the global pose. For instance, the computing system can determine which map tile is currently referenced by the global pose. Selecting the map tile can include predicting a future position of the autonomous vehicle at a future timestamp based on the motion input, the surfel registration input, and the lane alignment input, and selecting the map tile based on the future position of the autonomous vehicle. For instance, if the computing system predicts that the autonomous vehicle will move into a new map tile, the new map tile can be selected based on that future position of the autonomous vehicle. As used herein, selecting the map tile can include publishing the map tile and the future timestamp (e.g., for components of the autonomous vehicle to access).

At 908, a computing system can determine a motion plan for the autonomous vehicle based on the one or more pose states. For instance, the one or more pose states can describe the position, orientation, etc. of the autonomous vehicle with respect to the vehicle's environment. Additionally or alternatively, other systems onboard the autonomous vehicle, such as a perception system, etc., can provide information about other objects in the environment of the autonomous vehicle, such as other vehicles, travelways (e.g., roads, paths, etc.), pedestrians, static objects, signage, and so on. Using the one or more pose states and information about the environment of the autonomous vehicle, the vehicle computing system can determine a motion plan that allows the autonomous vehicle to navigate its environment.

At 910, an autonomous vehicle control system can control the autonomous vehicle based on the motion plan. The control system(s) can, for example, translate a motion plan into instructions for the appropriate platform control devices (e.g., acceleration control, brake control, steering control, etc.). By way of example, the control system(s) can translate a selected motion plan into instructions to adjust a steering component (e.g., a steering angle) by a certain number of degrees, apply a certain magnitude of braking force, increase/decrease speed, etc. In some implementations, the control system(s) can communicate with the platform control devices through communication channels including, for example, one or more data buses (e.g., controller area network (CAN), etc.), onboard diagnostics connectors (e.g., OBD-II, etc.), or a combination of wired or wireless communication links. The platform control devices can send or obtain data, messages, signals, etc. to or from the autonomy system(s) (or vice versa) through the communication channel(s).

Furthermore, in some implementations, the autonomous vehicle control system can control the autonomous vehicle based on the one or more pose states (e.g., by directly utilizing the one or more pose states). For instance, in some implementations, the autonomous vehicle can determine an expected pose of the autonomous vehicle in response to one or more control actions. As one example, if the autonomous vehicle control system is controlling the vehicle to execute a turn control action, the expected pose of the autonomous vehicle can be expected to follow a turn corresponding to the turn control action. The autonomous vehicle can compare the one or more pose states to the expected pose. In response to that comparison, the autonomous vehicle can determine a second control action. For example, if the determined pose states of the vehicle match the expected pose, the autonomous vehicle can continue with the first control action. If, however, the determined pose states deviate from the expected pose (e.g., beyond an expected error margin), the autonomous vehicle can perform the second control action to attempt to correct operation of the autonomous vehicle according to the motion plan. For instance, the second control action can include flagging the pose estimation system for recalibration or reinitialization. As another example, the second control action can include following a second motion plan.

Figure 10:
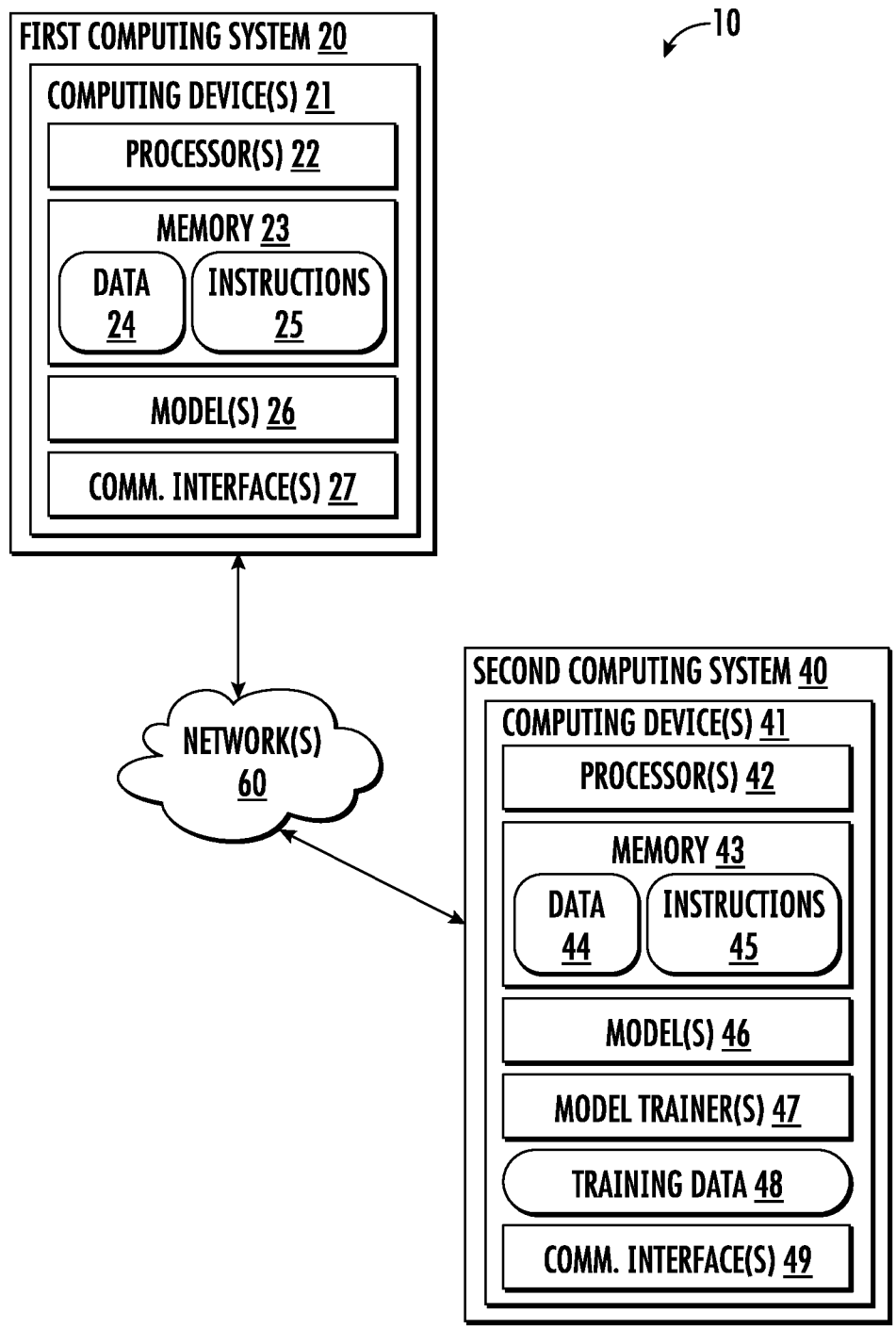
FIG. 10 is a block diagram of an example computing system for localizing an autonomous vehicle, according to some implementations of the present disclosure.

FIG. 10 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 10 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 can not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. An autonomous vehicle control system, comprising:
one or more processors; and
one or more non-transitory, computer-readable media storing instructions that cause the one or more processors to perform operations comprising:
 (a) obtaining, through one or more sensor systems onboard an autonomous vehicle, a motion input indicative of movement of the autonomous vehicle within an environment of the autonomous vehicle, a surface element (surfel) registration input representing an alignment of one or more tracked surface elements in the environment of the autonomous vehicle, and a lane alignment input representing an alignment of one or more lane boundaries in the environment of the autonomous vehicle;
 (b) providing the motion input, the surfel registration input, and the lane alignment input to a pose estimation system comprising a localization filter, the localization filter configured to fuse the motion input, the surfel registration input, and the lane alignment input;
 (c) generating, by the localization filter, two or more pose states of the autonomous vehicle, the two or more pose states comprising at least a local pose and a global pose;
 (d) determining a motion plan for the autonomous vehicle based on the two or more pose states; and
 (e) controlling the autonomous vehicle based on the motion plan.

2. The autonomous vehicle control system of claim 1, wherein the local pose is defined relative to an initial position of the autonomous vehicle in the environment and the global pose is defined relative to a tiled global map of the environment.

3. The autonomous vehicle control system of claim 1, wherein the operations further comprise:
 (e) estimating an initial pose state of the autonomous vehicle based on wheel encoder data from one or more wheel encoders positioned onboard the autonomous vehicle, wherein generating the two or more pose states is based on the initial pose state.

4. The autonomous vehicle control system of claim 1, further comprising:
aligning the two or more pose states to the one or more lane boundaries or the one or more tracked surface elements such that the one or more lane boundaries or the one or more tracked surface elements are consistent in a reference frame.

5. The autonomous vehicle of claim 1, wherein (c) comprises selecting a map tile, and wherein selecting the map tile comprises:
 (i) obtaining a first map tile based on the global pose;
 (ii) predicting a future position of the autonomous vehicle at a future timestamp based on the motion input, the surfel registration input, and the lane alignment input, and
 (iii) selecting the map tile based on the future position of the autonomous vehicle, wherein selecting the map tile comprises publishing the map tile and the future timestamp.

6. The autonomous vehicle control system of claim 1, wherein the one or more sensor systems comprise an inertial measurement unit (IMU), and wherein the motion input comprises data from the IMU.

7. The autonomous vehicle control system of claim 1, wherein the two or more pose states comprise a distribution of pose characteristics over time.

8. The autonomous vehicle control system of claim 1, wherein (c) comprises:
receiving an input corresponding to a prior timestamp;
updating a prior pose state at the prior timestamp based on the input to produce an updated prior pose state; and
propagating the updated prior pose state to a current timestamp to generate the two or more pose states.

9. The autonomous vehicle control system of claim 1, wherein the surfel registration input and the lane alignment input are based on at least one of a RADAR input or a LIDAR input.

10. The autonomous vehicle control system of claim 9, wherein the RADAR input is associated with a sensor velocity module configured to estimate velocity from the RADAR input.

11. A computer-implemented method, comprising:
(a) obtaining, through one or more sensor systems onboard an autonomous vehicle, a motion input indicative of movement of the autonomous vehicle within an environment of the autonomous vehicle, a surface element (surfel) registration input representing an alignment of one or more tracked surface elements in the environment of the autonomous vehicle, and a lane alignment input representing an alignment of one or more lane boundaries in the environment of the autonomous vehicle;
(b) providing the motion input, the surfel registration input, and the lane alignment input to a pose estimation system comprising a localization filter, the localization filter configured to fuse the motion input, the surfel registration input, and the lane alignment input;
(c) generating, by the localization filter, two or more pose states of the autonomous vehicle, the two or more pose states comprising a local pose and a global pose;
(d) determining a motion plan for the autonomous vehicle based on the two or more pose states; and
(e) controlling the autonomous vehicle based on the motion plan.

12. The computer-implemented method of claim 11, wherein the local pose is defined relative to an initial position of the autonomous vehicle in the environment and the global pose is defined relative to a tiled global map of the environment.

13. The computer-implemented method of claim 11, wherein the method further comprises:
(e) estimating an initial pose state of the autonomous vehicle based on wheel encoder data from one or more wheel encoders positioned onboard the autonomous vehicle, wherein generating the two or more pose states is based on the initial pose state.

14. The computer-implemented method of claim 11, wherein (c) comprises:
aligning the two or more pose states to the one or more lane boundaries or the one or more tracked surface elements such that the one or more lane boundaries or the one or more tracked surface elements are consistent in a reference frame.

15. The computer-implemented method of claim 11, wherein the one or more sensor systems comprise an inertial measurement unit (IMU), and wherein the motion input comprises data from the IMU.

16. The computer-implemented method of claim 11, wherein the two or more pose states comprise a distribution of pose characteristics over time.

17. The computer-implemented method of claim 11, wherein (c) comprises:
receiving an input corresponding to a prior timestamp;
updating a prior pose state at the prior timestamp based on the input to produce an updated prior pose state; and
propagating the updated prior pose state to a current timestamp to generate the two or more pose states.

18. An autonomous vehicle, comprising:
one or more processors; and
one or more non-transitory, computer-readable media storing instructions that cause the one or more processors to perform operations comprising:
(a) obtaining, through one or more sensor systems onboard an autonomous vehicle, a motion input indicative of movement of the autonomous vehicle within an environment of the autonomous vehicle, a surface element (surfel) registration input representing an alignment of one or more tracked surface elements in the environment of the autonomous vehicle, and a lane alignment input representing an alignment of one or more lane boundaries in the environment of the autonomous vehicle;
(b) providing the motion input, the surfel registration input, and the lane alignment input to a pose estimation system comprising a localization filter, the localization filter configured to fuse the motion input, the surfel registration input, and the lane alignment input;
(c) generating, by the localization filter, two or more pose states of the autonomous vehicle, the two or more pose states comprising a local pose and a global pose;
(d) determining a motion plan for the autonomous vehicle based on the two or more pose states; and
(e) controlling the autonomous vehicle based on the motion plan.

19. The autonomous vehicle of claim 18, wherein the local pose is defined relative to an initial position of the autonomous vehicle in the environment and the global pose is defined relative to a tiled global map of the environment.

20. The autonomous vehicle of claim 18, wherein the localization filter comprises a Kalman filter.

* * * * *